(12) United States Patent
Inoue et al.

(10) Patent No.: US 11,707,869 B2
(45) Date of Patent: Jul. 25, 2023

(54) FOAM MOLDING METHOD, FOAM MOLDED ARTICLE, AND METHOD FOR MANUFACTURING FOAM MOLDED ARTICLE

(71) Applicant: Marelli Corporation, Saitama (JP)

(72) Inventors: Mai Inoue, Saitama (JP); Masaharu Nagatsuka, Saitama (JP); Hisatsugu Satou, Saitama (JP); Akira Saitou, Saitama (JP); Norio Emori, Saitama (JP); Yuuta Igarashi, Saitama (JP); Ryou Sogawa, Saitama (JP); Takashi Fukuda, Saitama (JP)

(73) Assignee: Marelli Corporation, Saitama (JP)

( * ) Notice: Subject to any disclaimer, the term of this patent is extended or adjusted under 35 U.S.C. 154(b) by 349 days.

(21) Appl. No.: 16/618,568

(22) PCT Filed: May 21, 2018

(86) PCT No.: PCT/JP2018/019509
§ 371 (c)(1),
(2) Date: Dec. 2, 2019

(87) PCT Pub. No.: WO2018/225490
PCT Pub. Date: Dec. 13, 2018

(65) Prior Publication Data
US 2020/0164551 A1 May 28, 2020

(30) Foreign Application Priority Data

Jun. 8, 2017 (JP) .................................. 2017-113388
Jun. 12, 2017 (JP) .................................. 2017-114938
Jun. 12, 2017 (JP) .................................. 2017-114939

(51) Int. Cl.
*B32B 27/06* (2006.01)
*B32B 27/08* (2006.01)
(Continued)

(52) U.S. Cl.
CPC .......... *B29C 44/14* (2013.01); *B29C 44/1257* (2013.01); *B32B 3/02* (2013.01);
(Continued)

(58) Field of Classification Search
CPC ..... B29C 44/14; B29C 44/1257; B29C 44/58; B29C 39/10; B29C 39/26; B32B 3/02;
(Continued)

(56) References Cited

U.S. PATENT DOCUMENTS 5,500,168 A   3/1996   Suzuki
5,643,612 A   7/1997   Suzuki
(Continued)

FOREIGN PATENT DOCUMENTS

CN   102015373 A   4/2011
CN   102689607 A   9/2012
(Continued)

*Primary Examiner* — Elizabeth M Imani
(74) *Attorney, Agent, or Firm* — Global IP Counselors, LLP

(57) ABSTRACT

A foam molding method includes: sealing a core material and a skin material with a sealing part; and molding a foam layer on the inside of the sealing part. The sealing of the core material and the skin material with the sealing part includes sealing the core material and the skin material so that the sealing part includes a self sealing part for which an edge part of the skin material is housed in a recess provided in the core material, a clamp sealing part sealed by clamping the core material and the edge part of the skin material by foam molding molds, and a crimp sealing part arranged in a switchover part between the clamp sealing part and the self sealing part, and sealed by crimping the edge part of the skin material to the core material.

9 Claims, 21 Drawing Sheets

(51) Int. Cl.
- *B32B 5/20* (2006.01)
- *B32B 3/02* (2006.01)
- *B29C 44/58* (2006.01)
- *B29L 31/30* (2006.01)
- *B29C 44/14* (2006.01)
- *B29C 44/12* (2006.01)
- *B60R 13/02* (2006.01)
- *B29L 31/58* (2006.01)
- *B29L 31/00* (2006.01)

(52) U.S. Cl.
CPC .............. *B32B 5/20* (2013.01); *B32B 27/065* (2013.01); *B32B 27/08* (2013.01); *B60R 13/0256* (2013.01); *B29C 44/58* (2013.01); *B29L 2031/3008* (2013.01); *B29L 2031/58* (2013.01); *B29L 2031/771* (2013.01); *B32B 2605/003* (2013.01)

(58) Field of Classification Search
CPC ......... B32B 5/20; B32B 27/065; B32B 27/08; B32B 2605/003; B60R 13/0256; B29L 2031/3008; B29L 2031/58; B29L 2031/771
See application file for complete search history.

(56) References Cited

U.S. PATENT DOCUMENTS

| | | | |
|---|---|---|---|
| 5,736,082 A | 4/1998 | Funato et al. | |
| 5,922,431 A | 7/1999 | Funato et al. | |
| 5,976,289 A | 11/1999 | Kawakubo et al. | |
| 8,276,978 B2 | 10/2012 | Stachura et al. | |
| 2010/0264698 A1* | 10/2010 | Stachura | B29C 44/1238 264/46.5 |

FOREIGN PATENT DOCUMENTS

| | | | | |
|---|---|---|---|---|
| GB | 2 401 343 A | 11/2004 | | |
| JP | H07-156163 A | 6/1995 | | |
| JP | 07-329077 A | 12/1995 | | |
| JP | 08-127033 A | 5/1996 | | |
| JP | 10-067022 A | 3/1998 | | |
| JP | 10-225941 A | 8/1998 | | |
| JP | 11-156868 A | 6/1999 | | |
| JP | 2003-170763 A | 6/2003 | | |
| JP | 2005-342916 A | 12/2005 | | |
| JP | 2012-030714 A | 2/2012 | | |
| JP | 2015-205446 A | 11/2015 | | |
| JP | 2015205447 A | * 11/2015 | ........... | B29C 44/351 |
| JP | 2017-165019 A | 9/2017 | | |
| JP | 2017-165020 A | 9/2017 | | |
| JP | 2017-185686 A | 10/2017 | | |

* cited by examiner

FOAM MOLDING METHOD, FOAM MOLDED ARTICLE, AND METHOD FOR MANUFACTURING FOAM MOLDED ARTICLE

CROSS-REFERENCE TO RELATED APPLICATIONS

This is a U.S. national phase application of PCT/JP2018/019509, filed on May 21, 2018, which claims priority to Japanese Patent Application No. 2017-113388, filed on Jun. 8, 2017, Japanese Patent Application No. 2017-114938, filed on Jun. 12, 2017, and Japanese Patent Application No. 2017-114939, filed on Jun. 12, 2017. The entire disclosures of Japanese Patent Application Nos. 2017-113388, 2017-114938 and 2017-114939 are hereby incorporated herein by reference.

TECHNICAL FIELD

The present invention relates to a foam molding method, a foam molded article, and a method for manufacturing a foam molded article.

BACKGROUND ART

In a vehicle such as an automobile, etc., an instrument panel or other interior panel is installed inside a passenger compartment.

For this kind of interior panel, there are items configured using a foam molded article (see Japanese Unexamined Patent Publication No. 2003-220854, for example).

The foam molded article is an item for which a foam layer is formed between a core material and a skin material. The foam layer is formed by foam molding the core material and the skin material on the inside of a part sealed by a sealing part.

At this time, for the sealing part between the core material and the skin material, there is a self sealing part for which an edge part of the skin material is housed in a recess provided in the core material, and a clamp sealing part made by clamping the core material and the edge part of the skin material using a foam molding mold, etc.

Of these, in relation to the mold removal direction when doing injection molding of the core material, it is difficult to provide the self sealing part across the full circumference, and with the clamp sealing part, due to the necessity of cutting the core material and the edge part of the skin material in post-processing, etc., it is easy for wasted parts to occur, so molding is performed by combining the good parts of the self sealing part and the clamp sealing part.

SUMMARY

However, when the self sealing part and the clamp sealing part were provided in combination, there were problems such as a tendency for protrusion of the foam layer to occur from the switchover part between the self sealing part and the clamp sealing part.

In light of that, the purpose of the present matter is mainly to address the abovementioned problem.

To address the abovementioned problems, the present matter is a foam molding method for sealing a core material and a skin material with a sealing part, and molding a foam layer on the inside of the sealing part, characterized in that a portion of the sealing part is a self sealing part for which an edge part of the skin material is housed in a recess provided in the core material, and the remaining part of the sealing part is a clamp sealing part that clamps the core material and the edge part of the skin material using a foam molding mold, and a switchover part between the clamp sealing part and the self sealing part is a crimp sealing part that crimps the edge part of the skin material to the core material.

With the present matter, using the abovementioned configuration, it is possible to suppress protrusion of the foam layer at the switchover part of the self sealing part and the clamp sealing part, etc.

DETAILED DESCRIPTION OF EMBODIMENTS

Figure 1:
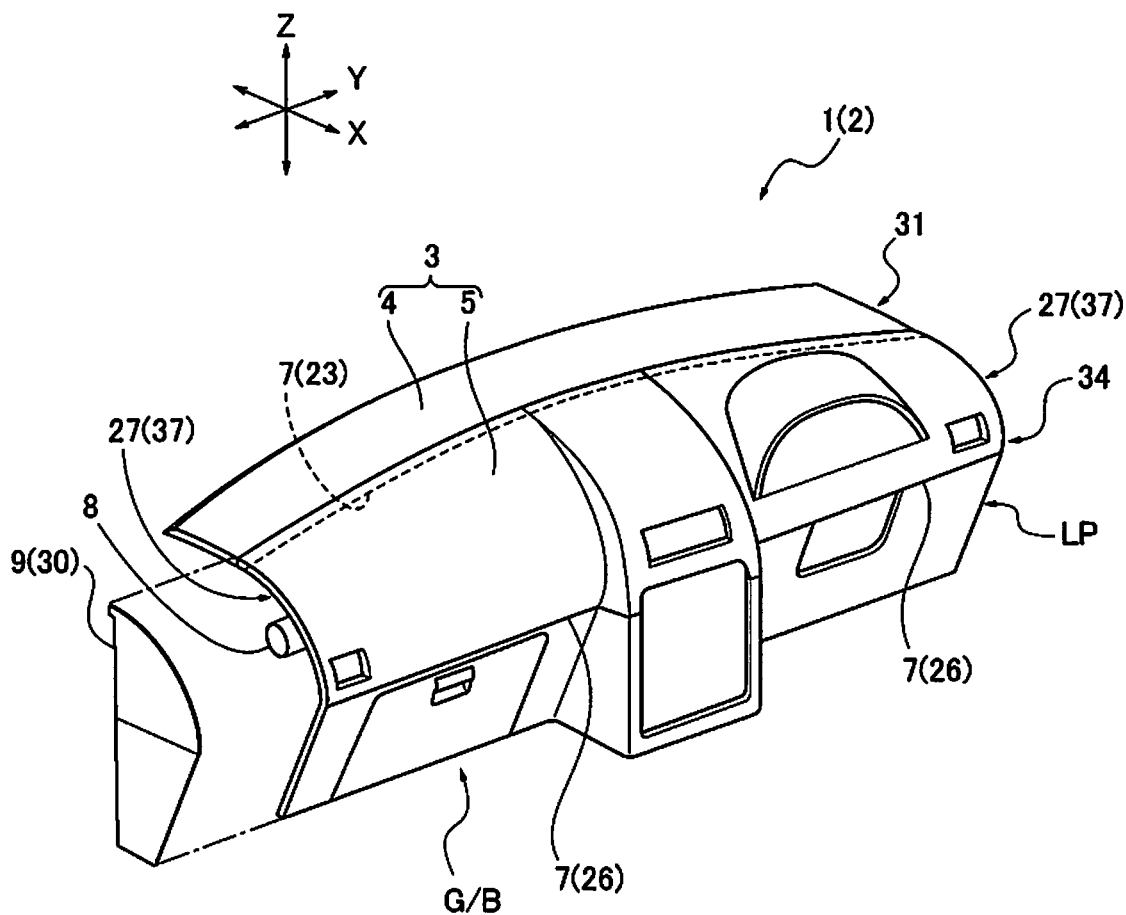
FIG. 1 is an overall perspective view of an instrument panel showing an example of a foam molded article of embodiment 1.

Hereafter, modes of embodiment are explained in detail using the drawings. FIG. 1 to FIG. 27 are for explaining the modes of embodiment.

Embodiment 1

Configuration

Hereafter, the configuration of this embodiment is explained.

The directions in the drawings are vehicle front-back direction X, vehicle width direction Y, and vertical direction Z.

As shown in FIG. 1, an interior panel 2 such as an instrument panel 1, etc., is installed inside a passenger compartment of a vehicle such as an automobile, etc.

Figure 2:
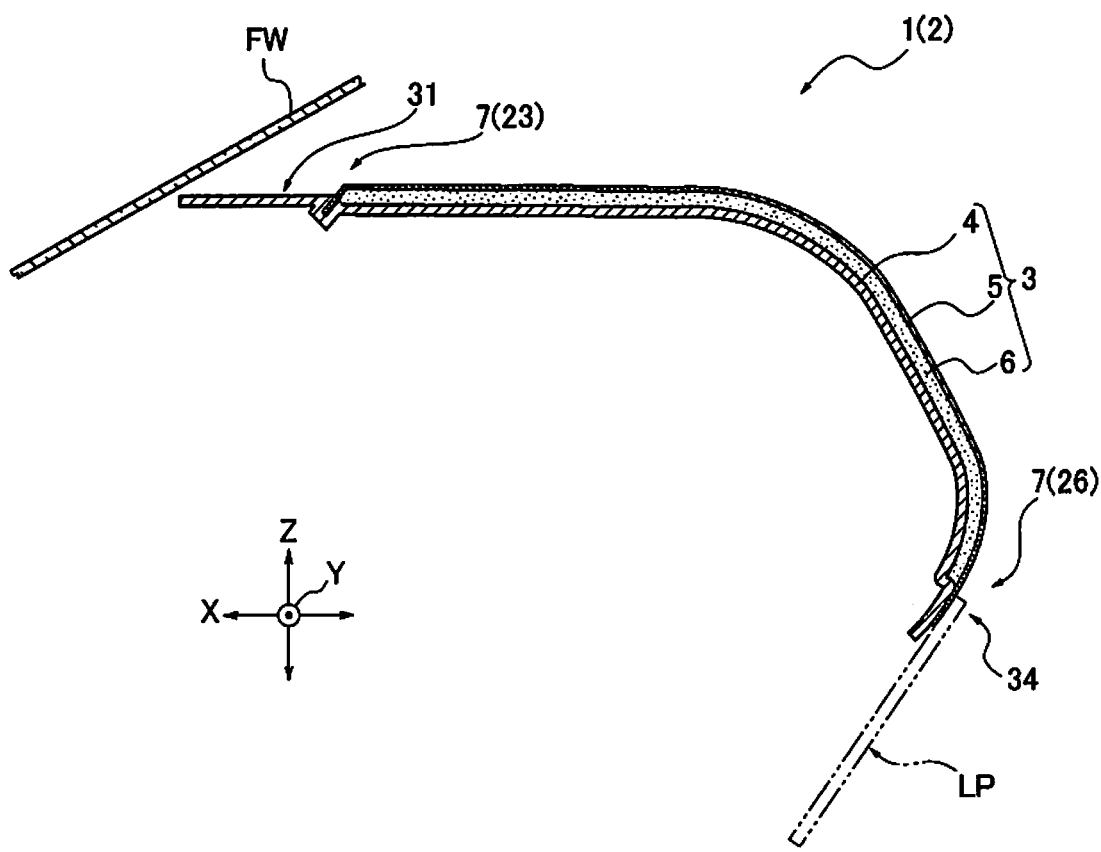
FIG. 2 is a vertical cross section view of the foam molded article of FIG. 1.

This kind of interior panel 2 is configured by a foam molded article 3 as shown in FIG. 2. The foam molded article 3 is an item for which a foam layer 6 is formed between a core material 4 and a skin material 5. The foam layer 6 is formed by foam molding on the inside of a part for which the core material 4 and the skin material 5 are sealed by a sealing part 7.

Here, the instrument panel 1 is a large panel installed at the bottom of a front window FW in the front part of the passenger compartment. A lower panel LP is installed at the bottom of the driver seat side of the instrument panel 1, and a glove box GB is installed at the bottom of the passenger seat of the instrument panel 1. Also, a vehicle body strengthening member 8 is installed extending substantially in the vehicle width direction Y on the interior of the instrument panel 1, and side panels 9 are attached to both end parts of the vehicle width direction Y of the instrument panel 1.

On the interior panel 2, in addition to the instrument panel 1, there are various items such as a center console, a door panel, a ceiling panel, or a sub panel to which these panels are attached, etc.

Figure 3:
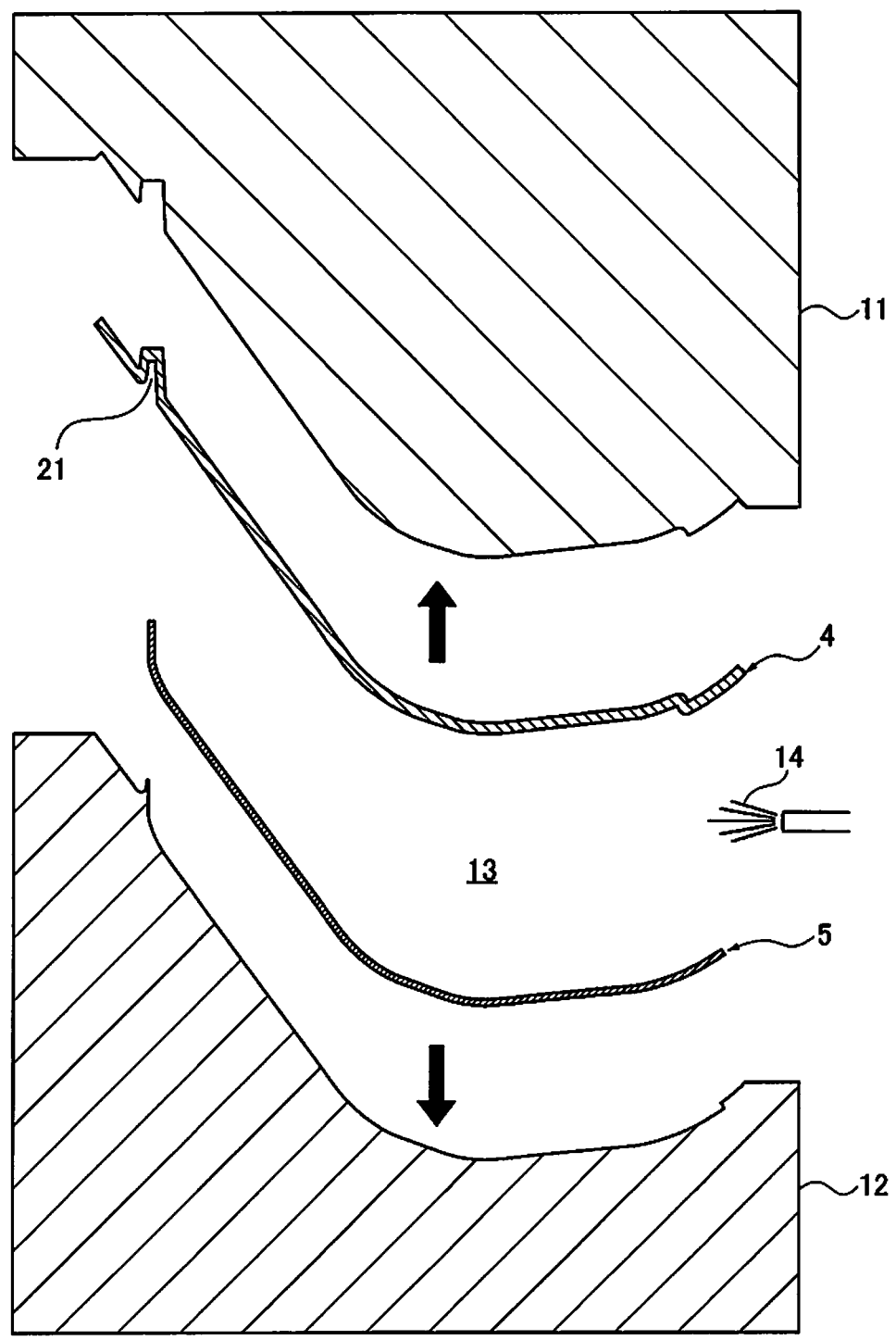
FIG. 3 is a drawing showing the foam molding method of the foam molded article of FIG. 1 (before foam molding).
Figure 4:
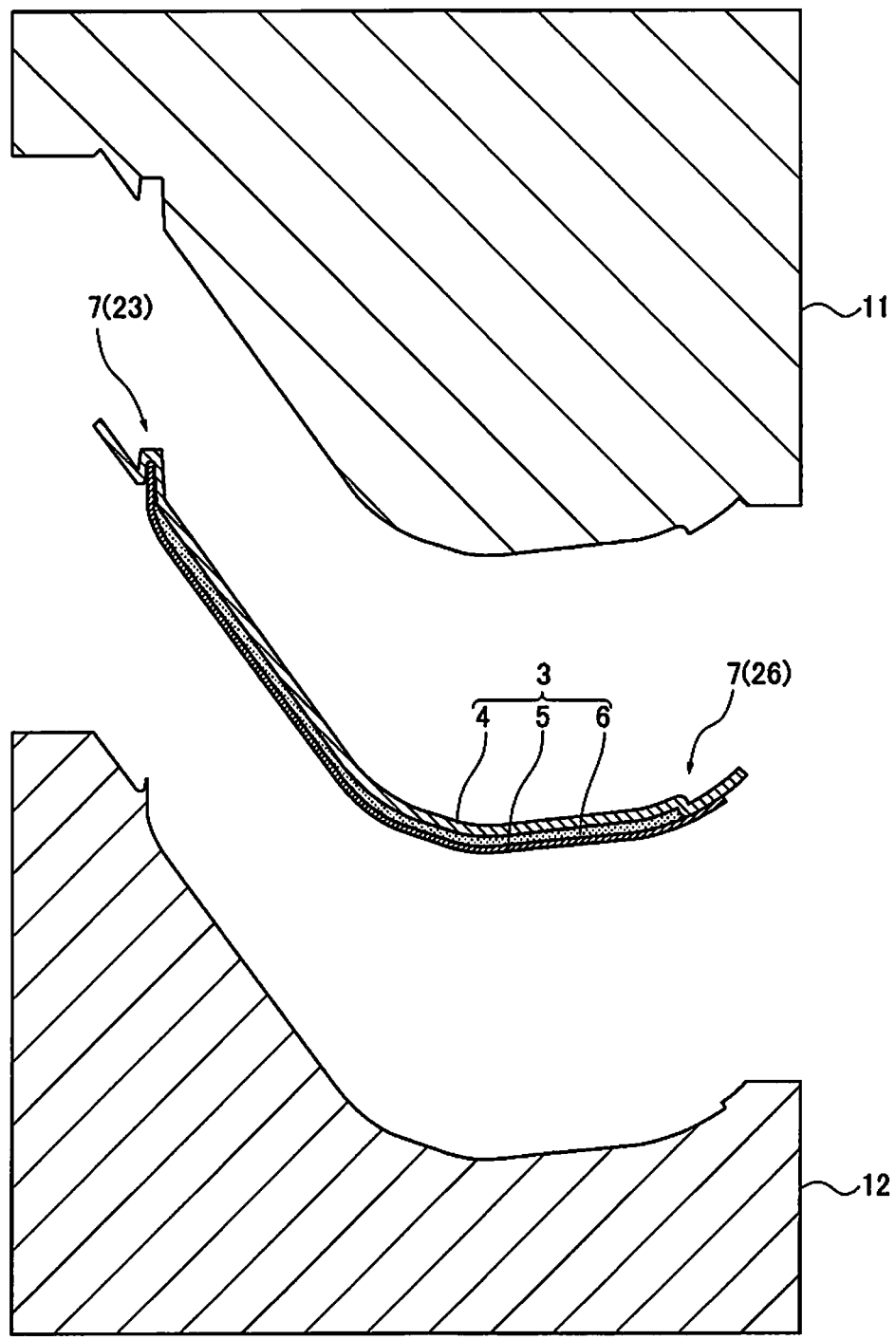
FIG. 4 is a drawing showing the foam molding method of the foam molded article of FIG. 1 (after foam molding).

As shown in FIG. 3, the foam molded article 3 is an item for which foaming of a foaming liquid 14 (or foaming agent) is done by injecting the foaming liquid 14 in a space (molding space 13) between the core material 4 and the skin material 5 set in foam molding molds 11, 12 of a foam molding device and doing mold clamping, and as shown in FIG. 4, the foam layer 6 is molded in the molding space 13. By doing foam molding, the core material 4, the skin material 5, and the foam layer 6 are made into an integral unit.

The core material 4 is a member configuring the rear surface side of the interior panel 2, and is made relatively thick using a hard resin. The core material 4 basically has a substantially constant thickness. The skin material 5 is a member that configures the front surface side (design surface) of the interior panel 2. The skin material 5 basically has a substantially constant thickness. The foam layer 6 is configured using foam urethane, etc. that has cushioning. The foam layer 6 basically has a substantially constant thickness.

In the foam molding device, typically, the flexible skin material 5 is set in the lower mold (foam molding mold 12), and the hard core material 4 is set in the upper mold (foam molding mold 11). However, in the drawings hereafter, there are cases of being upside down for easier viewing.

For the basic configuration like that described above, with this embodiment, the following kind of configuration is provided.

First, the foam molding method is explained.

Figure 5:
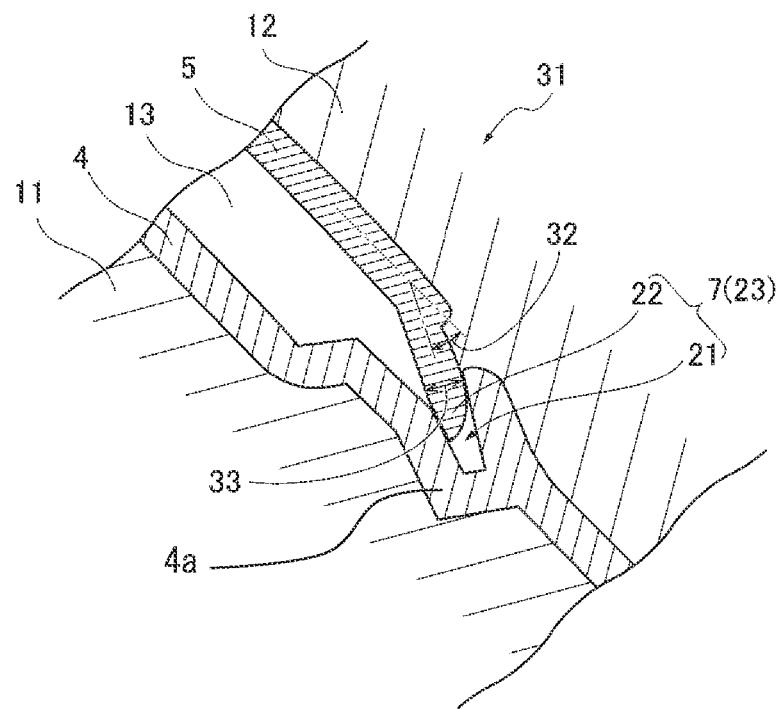
FIG. 5 is a partial enlarged cross section view of a self sealing part on the inside of the foam molding device.
Figure 6:
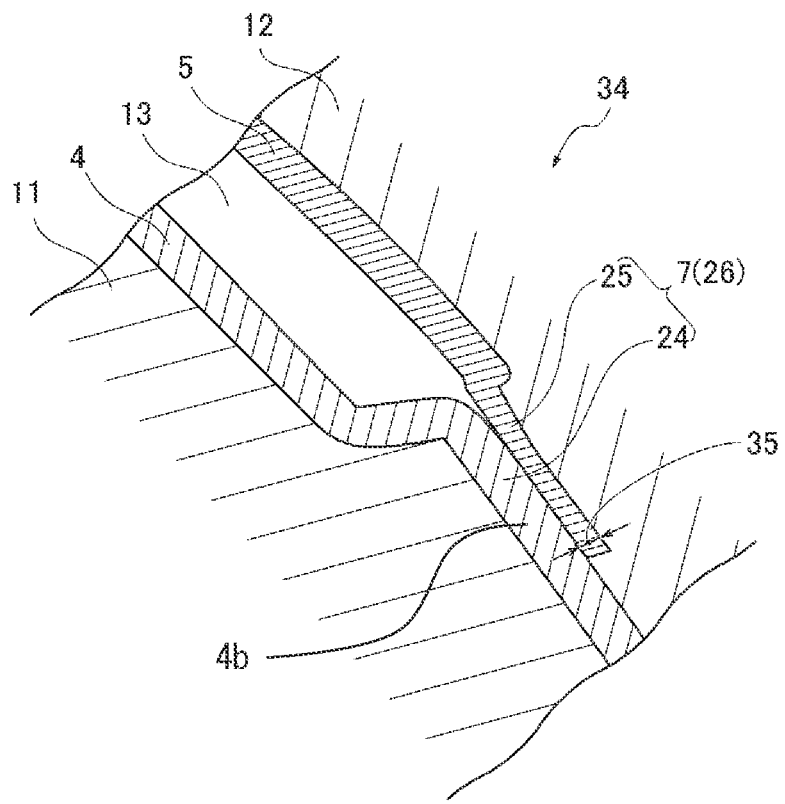
FIG. 6 is a partial enlarged cross section view of a clamp sealing part on the inside of the foam molding device.

(1-1) As shown in FIG. 5, a portion of the sealing part 7 is used as a self sealing part 23 for which a first edge part 22 of the skin material 5 is housed in a recess 21 provided in a first portion 4a of a contact part of the core material 4. Also, as shown in FIG. 6, the remaining part of the sealing part 7 is used as a clamp sealing part 26 for which a second portion 4b of the contact part of the core material 4 (its surface 24) and a second edge part 25 of the skin material 5 are clamped by foam molding molds 11, 12.

Figure 7:
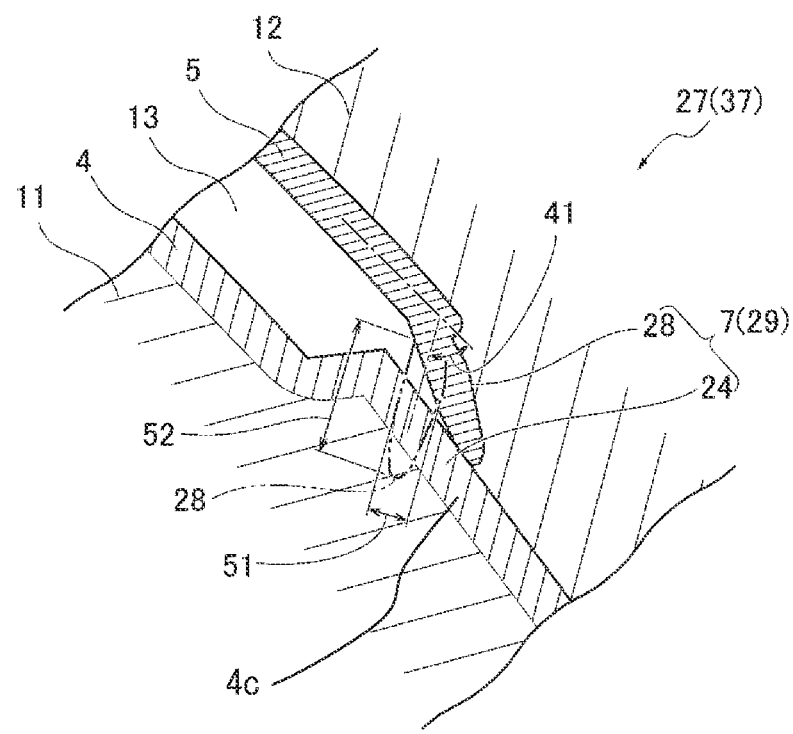
FIG. 7 is a partial enlarged cross section view of a crimp sealing part on the inside of the foam molding device.
Figure 8:
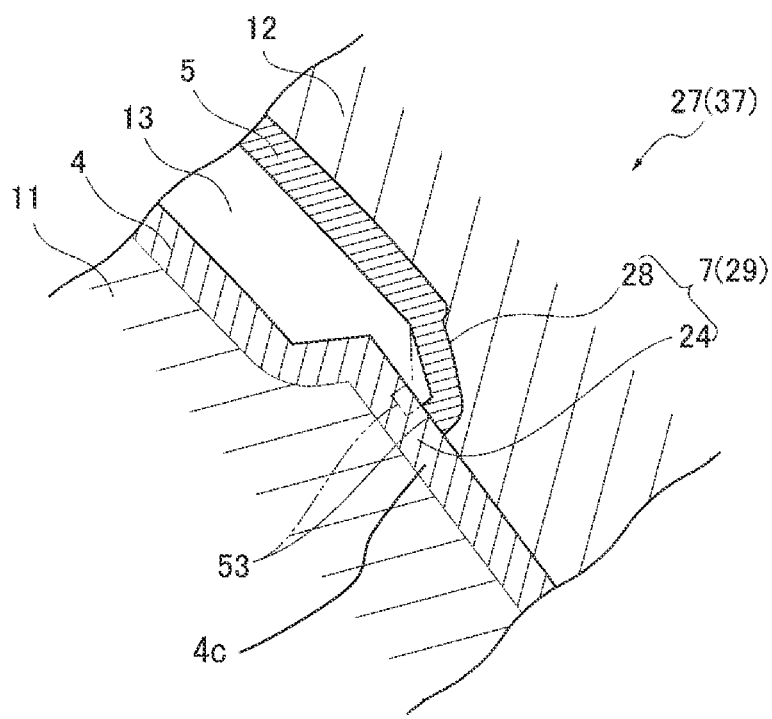
FIG. 8 is a partial enlarged cross section view showing a modification example of the crimp sealing part of FIG. 7.

Also, as shown in FIG. 7 and FIG. 8, a switchover part 27 between the clamp sealing part 26 and the self sealing part 23 is used as a crimp sealing part 29 that crimps at least a portion of the third edge part 28 of the skin material 5 (near the tip part, for example) to a third portion 4c of the contact part of the core material 4 (its surface 24).

Here, as shown in FIG. 5, the recess 21 of the self sealing part 23 can be provided as a C-shaped (U-shaped) or a bifurcated shape on the core material 4. The self sealing part 23 is the sealing part 7 made to perform sealing between the core material 4 and the skin material 5. For the self sealing part 23, there is an item for which the first edge part 22 of the skin material 5 is strongly fitted in the recess 21 provided in the core material 4, and sealing force is obtained by the fitting force of recess and projection fitting of both, and an item for which the first edge part 22 of the skin material 5 is loosely fit or weakly fit in the recess 21 of the core material 4, and sealing force is obtained by crimping the first edge part 22 of the skin material 5 to the recess 21 of the core material 4 using the foaming pressure of the foaming liquid 14. With this embodiment the former is used. The self sealing part 23, for example, is used at a position such as at which a portion of the core material 4 is exposed at the surface, etc., such as the front edge part of the instrument panel 1 and its periphery (front edge side part 31, see FIG. 2).

As shown in FIG. 5, with the self sealing part 23, the first edge part 22 of the skin material 5 is formed having a desired bending angle 32 with respect to the design surface of the skin material 5, etc., so as to easily obtain the sealing effect when fitted in the recess 21. With the self sealing part 23, the first edge part 22 of the skin material 5 is formed to be the same or slightly thicker (thickness 33) than the other parts of the skin material 5 (design surface, etc.).

As shown in FIG. 6, the clamp sealing part 26 is the sealing part 7 made to perform sealing using the mold clamping force of the foam molding molds 11, 12. The clamp sealing part 26, for example, such as with a back edge part 34 (or bottom edge part) of the instrument panel 1, is used in a position such as one in which it will not stand out visually from outside. The periphery of the clamp sealing part 26 can have the unnecessary parts cut after molding.

With the clamp sealing part 26 in the drawing, the second edge part 25 of the skin material 5 is overlapped in parallel on the surface 24 of the core material 4. For that reason, with the clamp sealing part 26, the second edge part 25 of the skin material 5 is formed in a state having almost no angle with respect to the design surface of the skin material 5, etc. With the clamp sealing part 26, the second edge part 25 of the skin material 5 is formed to be the same or slightly thinner (thickness 35) than the other parts of the skin material 5.

The switchover part 27 is the boundary part of the clamp sealing part 26 and the self sealing part 23, and for example, is set at the position of both side parts 37 of the instrument panel 1, etc. With the switchover part 27, the third edge part 28 of the skin material 5 is mold clamped by the foam molding molds 11, 12 in a state sticking out from the recess 21 of the core material 4 configuring the self sealing part 23, and also in a state not overlapping in parallel on the surface 24 of the core material 4. For that reason, the crimp sealing part 29 is made to be an item that uses the flexibility of the skin material 5 itself so that the third edge part 28 of the skin material 5 crimps itself to the core material 4.

(1-2) As shown in FIG. 7, the crimp sealing part 29 can also have a bending angle 41 (with respect to the design surface or an inner part of the skin material 5, etc.) of the third edge part 28 of the skin material 5 be greater than the bending angle 32 of the first edge part 22 of the self sealing part 23 (bending angle 41>bending angle 32).

Here, with the crimp sealing part 29, the third edge part 28 of the skin material 5, so as to be substantially the same as the bending angle 32 of the first edge part 22 of the self sealing part 23 in contact with the core material 4 (its surface 24) when mold clamped, is preferably set to a bending angle 41 that is greater than the bending angle 32 of the first edge part 22 of the self sealing part 23.

(1-3) The crimp sealing part 29 can be made thicker (thickness 51) than other parts of the third edge part 28 of the skin material 5.

Also, the crimp sealing part 29 can be an item having a length 52 for which the third edge part 28 of the skin material 5 interferes with the core material 4.

Or, as shown in FIG. 8, it is also possible to have an interference part 53 extending in the direction that interferes with the core material 4.

Here, with the crimp sealing part 29, the third edge part 28 of the skin material 5 is preferably made to be the same or thicker than the first edge part 22 of the self sealing part 23. With the crimp sealing part 29, the third edge part 28 of the skin material 5 is preferably the same or longer than the first edge part 22 of the self sealing part 23.

The interference part 53 can be an item for which the tip part of the third edge part 28 of the crimp sealing part 29 is bent facing the core material 4. The interference part 53 is formed at a length and angle that interferes with the core material 4 in the state before mold clamping.

The configurations of the abovementioned (2) and (3) can also be combined as appropriate. The foam molded article 3 molded in this way becomes an item like that shown in FIG. 9, and FIG. 10 to FIG. 12. The foam molded article 3 will be described later.

Figure 13:
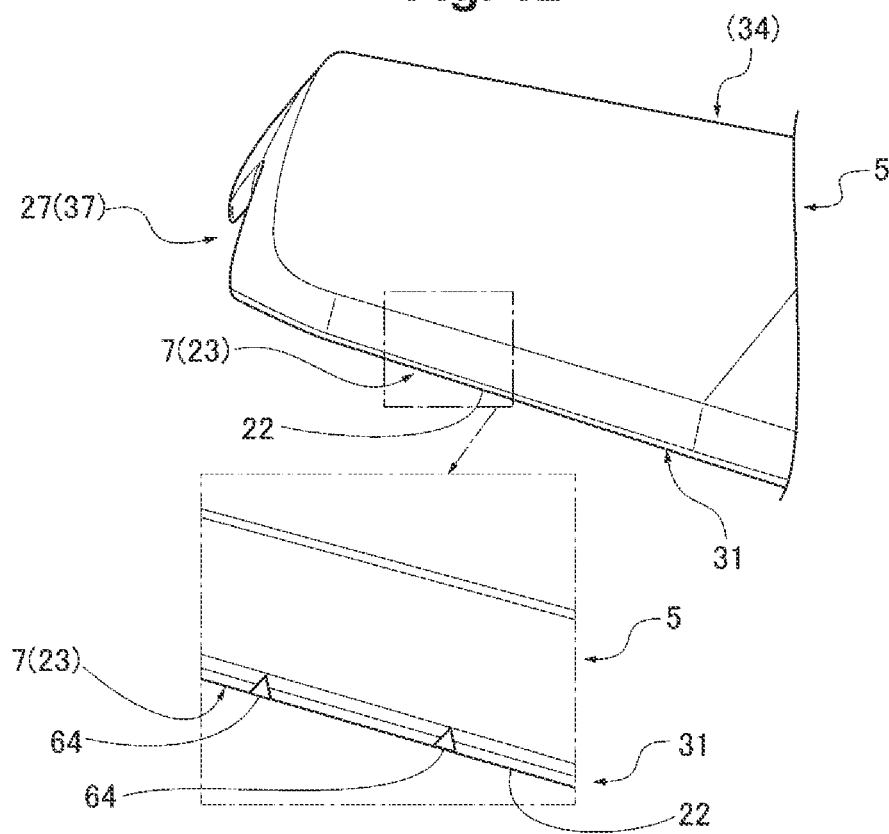
FIG. 13 is a partial enlarged perspective view, and a partial enlarged view thereof, showing a part for which a gas release structure is provided at the position of the self sealing part of the skin material.
Figure 14:
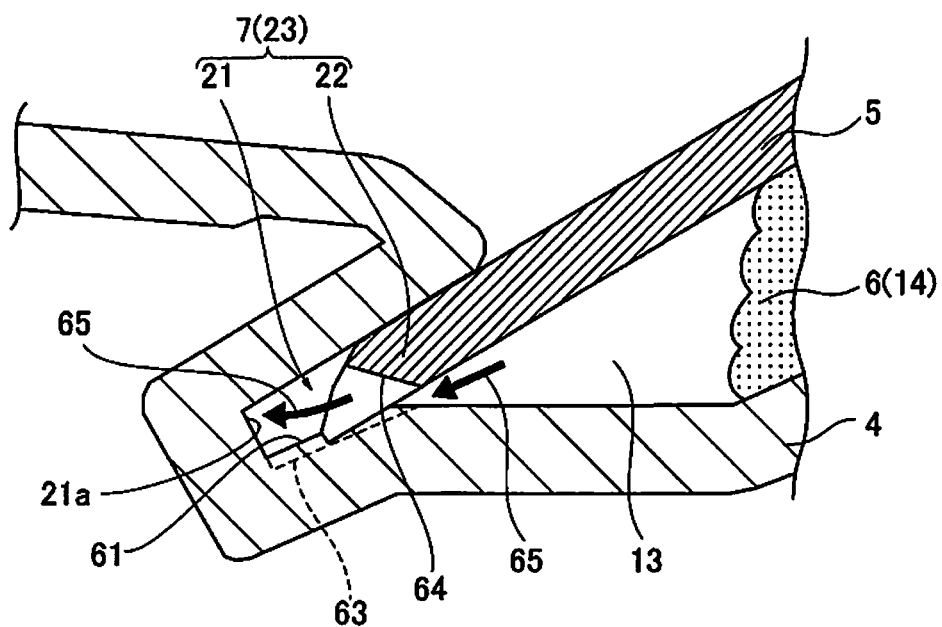
FIG. 14 is a cross section end view of the gas release structure part of FIG. 13.

(1-4) As shown in FIG. 13 and FIG. 14, it is possible to provide an inner circumference wall 61 of the recess 21 of the core material 4, or a communication opening including at least one of a partial groove part 63 and a notch part 64 in fluid communication with a bottom part 21a of the recess 21 with respect to the first edge part 22 of the skin material 5 in the self sealing part 23.

Also, it is possible to have a gas 65 generated between the core material 4 and the skin material 5 during molding of the foam layer 6 escape to the bottom part 21a of the recess 21 through the partial groove part 63 or the notch part 64.

Also, it is possible to guide the gas 65 from the bottom part 21a of the recess 21 to the position of the (adjacent) crimp sealing part 29, and to release the gas 65 to outside from the crimp sealing part 29 or the clamp sealing part 26 position.

Here, at the molding space 13 between the core material 4 and the skin material 5, there is a risk of the gas 65 accumulating due to foaming of the foaming liquid 14. Also, when this gas 65 is left unreleased, this is a cause of molding defects because the foam layer 6 can't reach every corner of the molding space 13.

In light of that, gas release is necessary, but with this embodiment, gas release is made to be performed by the crimp sealing part 29 or the sealing part 7.

For that reason, the groove part 63 is made to be provided on the inner circumference wall 61 of the recess 21 of the core material 4. Also, the notch part 64 is made to be provided on the third edge part 28 (its tip part) of the skin material 5. With the groove part 63 and the notch part 64, one or both are made to be provided. The groove part 63 and the notch part 64 are preferably provided at the position of the front edge side part 31 of the instrument panel 1 at which a portion of the core material 4 is exposed.

When performing gas release at the position of the crimp sealing part 29, it is possible, for example, at a portion of the position of the switchover part 27, to have a concavity 66 (FIG. 9) that is deeper than the recess 21 of the self sealing part 23 be partially provided in the core material 4, and to have gas release performed from the concavity 66.

Also, when performing gas release at the position of the sealing part 7, it is preferable to provide a gas release hole as appropriate in the core material 4. With this embodiment, gas release is made to be performed actively at the position of the crimp sealing part 29 at which the sealing force is susceptible to being weakest.

Next, the foam molded article 3 molded using the foam molding method described above is explained.

Figure 9:
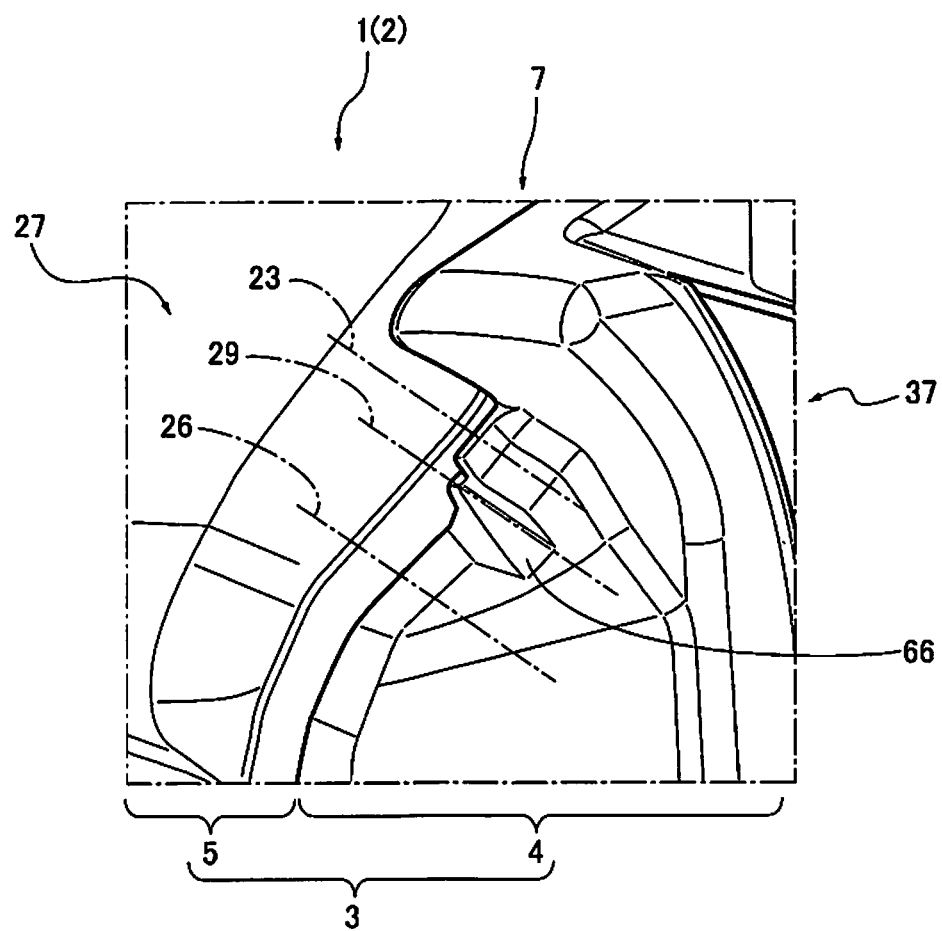
FIG. 9 is a partial enlarged perspective view showing the structure of the periphery of the switchover part between the self sealing part and the clamp sealing part of the foam molded article.

The foam molded article 3, as has already been described above, has the core material 4, the skin material 5, and the foam layer 6, and also is an item for which the foam layer 6 is formed on the inside of the part for which the core material 4 and the skin material 5 are sealed by the sealing part 7 (see FIG. 2, FIG. 9).

Figure 10:
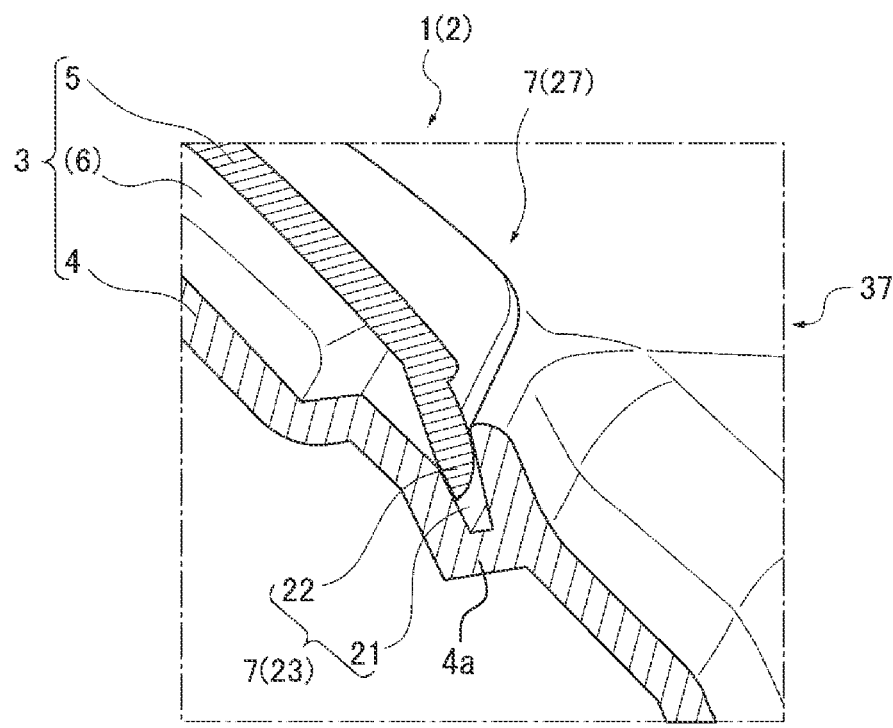
FIG. 10 is a partial enlarged cross section view of the self sealing part of FIG. 9.
Figure 11:
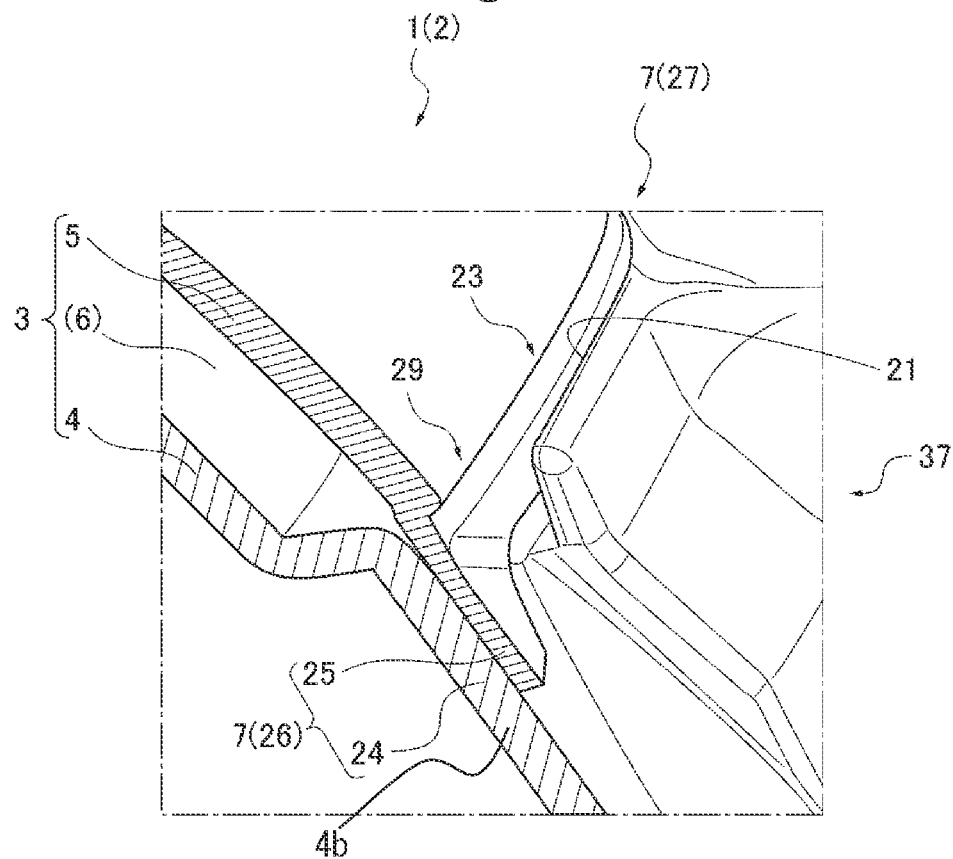
FIG. 11 is a partial enlarged cross section view of the clamp sealing part of FIG. 9.

(1-5) With the foam molded article 3 of this embodiment, as shown in FIG. 10 (FIG. 5), for a portion of the sealing part 7, there is the self sealing part 23 for which the first edge part 22 of the skin material 5 is housed in the recess 21 provided in the core material 4. Also, for the remaining part of the sealing part 7, as shown in FIG. 11 (FIG. 6), there is the clamp sealing part 26 for which the core material 4 (its surface 24) and the second edge part 25 of the skin material 5 are clamped by the foam molding molds 11, 12.

Figure 12:
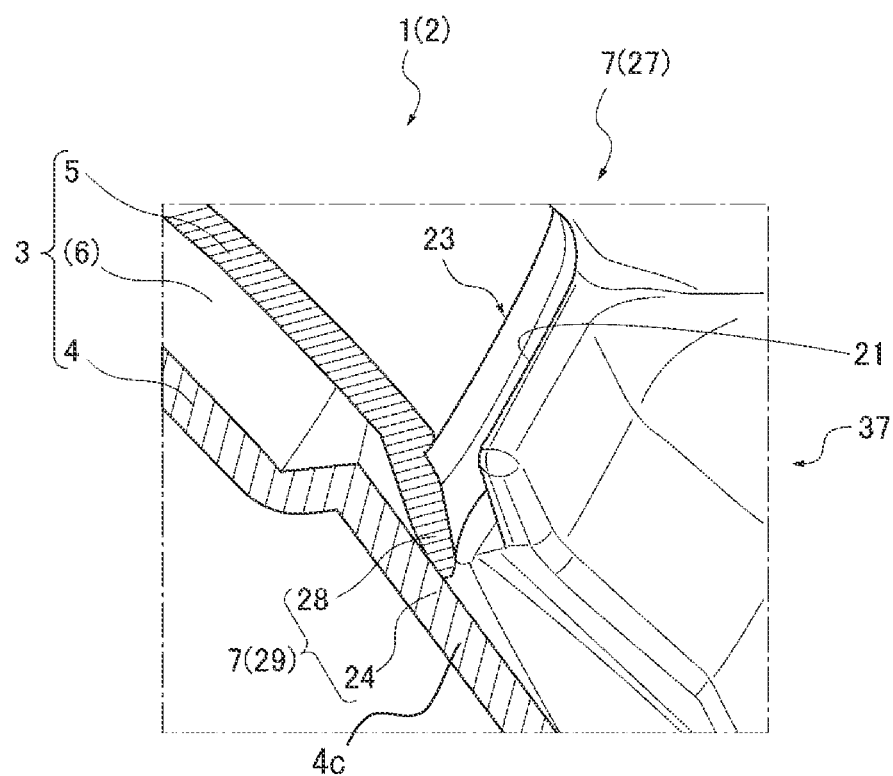
FIG. 12 is a partial enlarged cross section view of the crimp sealing part of FIG. 9.

Also, as shown in FIG. 12 (FIG. 7, FIG. 8), at the switchover part 27 between the clamp sealing part 26 and the self sealing part 23, there is the crimp sealing part 29 that crimps the third edge part 28 of the skin material 5 to the core material 4.

(1-6) The crimp sealing part 29 can be made to have the bending angle 41 of the third edge part 28 of the skin material 5 (in the state before molding) be greater than the bending angle 32 of the first edge part 22 of the self sealing part 23.

(1-7) With the crimp sealing part 29, the third edge part 28 of the skin material 5 is thicker than the other parts, and with the crimp sealing part 29, there is the length 52 for which the third edge part 28 of the skin material 5 interferes with the core material 4, or there can also be the interference part 53 that extends in a direction that interferes with the core material 4.

(1-8) The self sealing part 23 can be made to have an inner circumference wall 61 of the recess 21 of the core material 4, or at least one of the partial groove part 63 and notch part 64 in communication with the bottom part 21a of the recess 21 on the first edge part 22 of the skin material 5.

Operational Effects

With this embodiment, it is possible to obtain the kind of operational effects below.

(Effect 1-1) The switchover part 27 of the self sealing part 23 and the clamp sealing part 26 are used as the crimp sealing part 29. By doing this, the crimp sealing part 29 is an item for which the third edge part 28 of the skin material 5 is sealed by self crimping to the surface 24 of the core material 4 by mold clamping, so it is possible to suppress protrusion of the foam layer 6 from the switchover part 27, and thus possible to eliminate trouble such as applying sealing tape to seal the switchover part 27.

(Operational Effect 1-2) The bending angle 41 of the third edge part 28 of the skin material 5 of the crimp sealing part 29 can also be made greater than the bending angle 32 of the first edge part 22 of the self sealing part 23. By doing this, it is possible to reliably crimp the third edge part 28 of the skin material 5 to the core material 4 with the crimp sealing part 29.

(Operational Effect 1-3) It is also possible to make the third edge part 28 of the skin material 5 of the crimp sealing part 29 thick, to have the length 52 that interferes with the core material 4, or to have the interference part 53 that extends in the direction that interferes with the core material 4. As a result of these, it is possible to more reliably crimp the third edge part 28 of the skin material 5 in the crimp sealing part 29 to the core material 4, and to ensure and improve sealability.

(Operational Effect 1-4) It is also possible to provide the inner circumference wall 61 of the recess 21 of the core material 4 in the self sealing part 23, or the groove part 63 or the notch part 64 on the first edge part 22 of the skin material 5, and to guide the gas 65 to the bottom part 21a of the recess 21 via the groove part 63 of the notch part 64. By doing this, it is possible to effectively use the recess 21 of the self sealing part 23 to perform gas release from the crimp sealing part 29, the clamp sealing part 26, etc.

Embodiment 2

(2-1) As shown in FIG. 5, a portion of the sealing part 7 is used as the self sealing part 23 for which the first edge part 22 of the skin material 5 is housed in the recess 21 provided in the core material 4. Also, as shown in FIG. 6, the remaining part of the sealing part 7 is used as the clamp sealing part 26 for which the core material 4 (its surface 24) and the second edge part 25 of the skin material 5 are clamped by the foam molding molds 11, 12.

Figure 15:
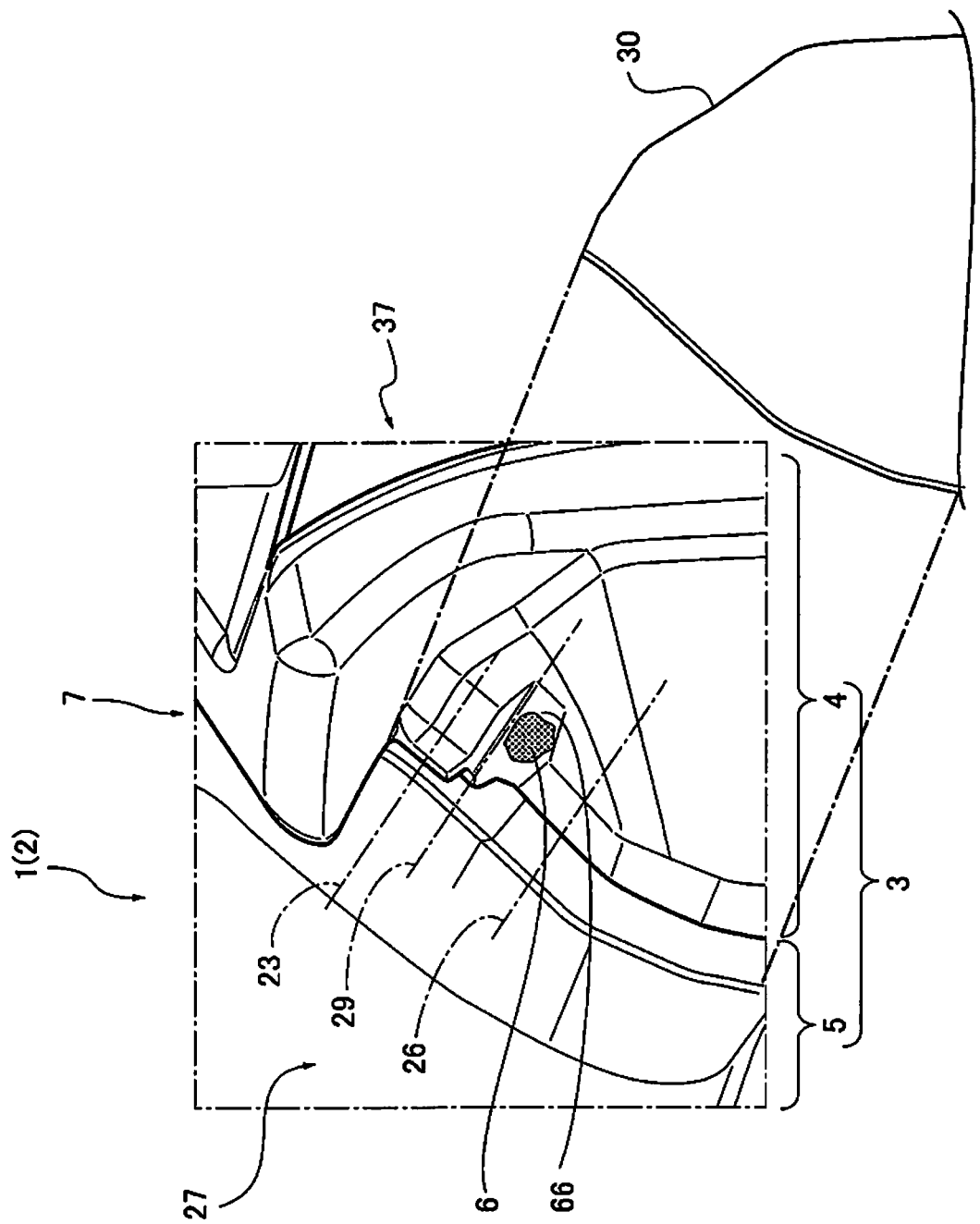
FIG. 15 is a partial enlarged perspective view showing the structure of the periphery of the switchover part of the self sealing part and the clamp sealing part of the foam molded article of embodiment 2.

Also, as shown in FIG. 15, the switchover part 27 between the clamp sealing part 26 and the self sealing part 23 is made to be hidden by a cover part 30.

Here, for example, the cover part 30 is a part attached to both side parts 37 of the instrument panel 1, etc. For example, when making the cockpit part of an automobile into module form to use a cockpit module, the side panels 9 are attached to both side parts 37 of the instrument panel 1 to plug the attachment hole of an auxiliary device for mounting the cockpit module into the car body. With this side panel 9 as the cover part 30, it is also possible to plug the switchover part 27 with the cover part 30. Alternatively, the cover part 30 can also be provided separately from the side panel 9.

(2-2) As shown in FIG. 15, it is also possible to provide the concavity 66 that is deeper than the recess 21 of the self sealing part 23 at the position of the switchover part 27 of the core material 4.

Here, the concavity 66 is a location that is partially recessed to the rear surface side of the core material 4. This concavity 66 can be set to a portion of the switchover part 27 as a site for actively receiving protrusion of the foam layer 6. When providing the crimp sealing part 29 in the switchover part 27, the concavity 66 is preferably provided at a position that avoids the crimp sealing part 29.

Figure 16:
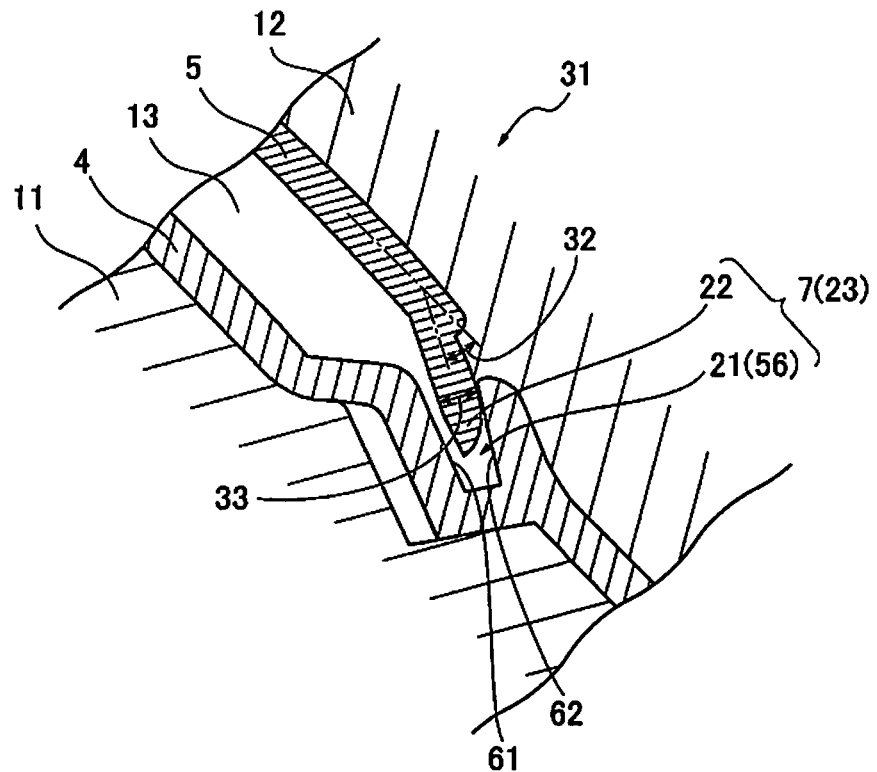
FIG. 16 is a cross section view showing the termination part of the self sealing part.
Figure 17:
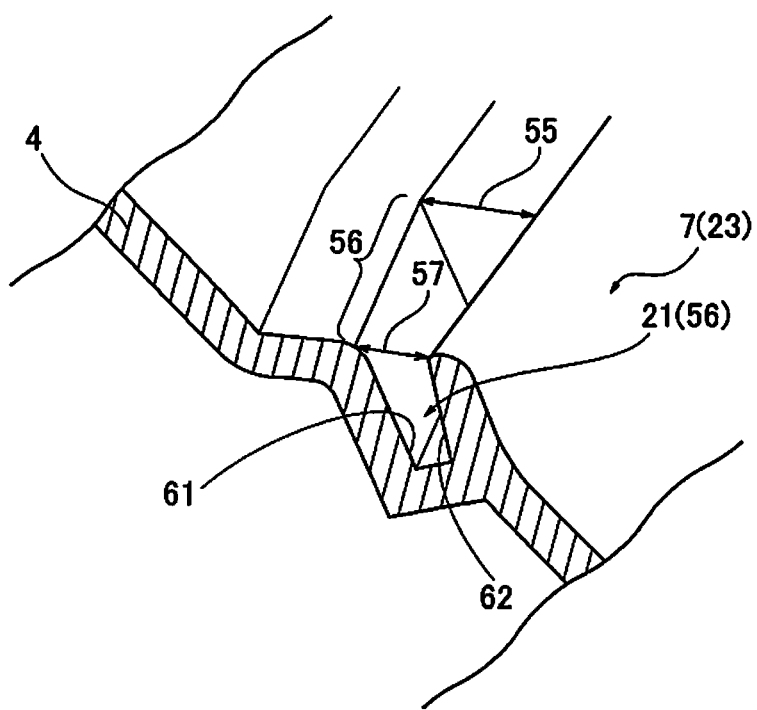
FIG. 17 is a perspective view of FIG. 16.

(2-3) As shown in FIG. 16 and FIG. 17, it is also possible to provide a narrow width part 56 for which a groove width 55 of the recess 21 of the core material 4 narrows facing the switchover part 27 at the termination part of the self sealing part 23.

Here, the termination part of the self sealing part 23 means the part in the vicinity of the switchover part 27 of the self sealing part 23. As described above, the self sealing part 23 of this embodiment is set so that the groove width 55 of the recess 21 of the core material 4 is greater than the thickness (thickness 33) of the first edge part 22 of the skin material 5. Also, except for the termination part, the self sealing part 23 has the groove width 55 of the recess 21 be substantially constant.

Also, with the narrow width part 56 provided at the termination part of the self sealing part 23, the groove width 57 of the recess 21 of the core material 4 is made to gradually become narrower (groove width 55>groove width 57). The final groove width 57 of the narrow width part 56 can be set as appropriate within the range for which the first edge part 22 of the skin material 5 has a loose fit or weak fit in the recess 21 of the core material 4.

(2-4) The narrow width part 56 can also be made so that the inner circumference wall 61 of the recess 21 gradually approaches toward the outer circumference wall 62 of the recess 21.

Here, the narrow width part 56 can also be made so that the outer circumference wall 62 of the recess 21 gradually approaches the inner circumference wall 61 of the recess 21, and can also be made so that the outer circumference wall 62 of the recess 21 and the inner circumference wall 61 of the recess 21 gradually approach each other. However, the narrow width part 56 is optimal in terms of structure when the inner circumference wall 61 of the recess 21 gradually approaches the outer circumference wall 62 of the recess 21.

Operational Effects

According to this embodiment, it is possible to obtain the following kinds of operational effects.

(Operational Effect 2-1) The switchover part 27 of the self sealing part 23 and the clamp sealing part 26 was made to be hidden by the cover part 30. By doing this, even if protrusion of the foam layer 6 occurs at the switchover part 27, by hiding the protruding foam layer 6 using the cover part 30, it is possible to easily finish the switchover part 27 and its periphery with a good appearance.

Also, it is no longer necessary to remove the foam layer 6 that protruded at the switchover part 27 with post-processing, so it is possible to reduce effort and cost by that amount.

(Operational Effect 2-2) The concavity 66 that is deeper than the recess 21 was provided on the switchover part 27. By doing this, the site at which the protrusion of the foam layer 6 occurs is set to the position of the switchover part 27, and it is possible to actively guide and gather the foam layer 6 in the concavity 66 provided in the switchover part 27. Thus, it is possible to suppress the occurrence of protrusion of the foam layer 6 to parts other than the switchover part 27.

Also, by having the concavity 66 be deeper than the recess 21, even in a case where there is a large amount of protrusion of the foam layer 6, it is possible to house the foam layer 6 in the concavity 66 without hindrance.

(Operational Effect 2-3) The narrow width part 56 that becomes narrower facing the switchover part 27 was provided at the termination part of the self sealing part 23, making the groove width 55 of the recess 21 narrower. By doing this, it is possible to regulate the foam layer 6 facing from the recess 21 toward the switchover part 27 (its concavity 66) at the position of the narrow width part 56. Also, by this regulating effect by the narrow width part 56, it is possible to lessen the amount of the foam layer 6 that protrudes, and also possible to make it possible for gas to be released via the narrow width part 56 for gas that occurs during foaming of the foam layer 6. As a result, there is less protrusion of the foam layer 6, and it is also possible to have the foam layer 6 spread to every corner of the molding space 13 by sufficiently performing gas release.

(Operational Effect 2-4) The narrow width part 56 made to have the inner circumference wall 61 of the recess 21 gradually approach the outer circumference wall 62 of the recess 21 was formed. By doing this, while minimizing the effect on the shape of the foam molded article 3, it is possible to produce the narrow width part 56 of the recess 21 without excessive structure.

Embodiment 3

Configuration

First, the configuration is explained.

The foam molded article 3 of embodiment 3, for example, is applied to the instrument panel 1 as the interior panel 2 placed at the front part inside the passenger compartment of a vehicle such as an automobile, etc. Following, the configuration of embodiment 3 is explained divided into "Overall Configuration of the Interior Panel," "Detailed Configuration of the Instrument Panel," and "Method for Manufacturing the Instrument Panel."

Overall Configuration of the Interior Panel

Figure 18:
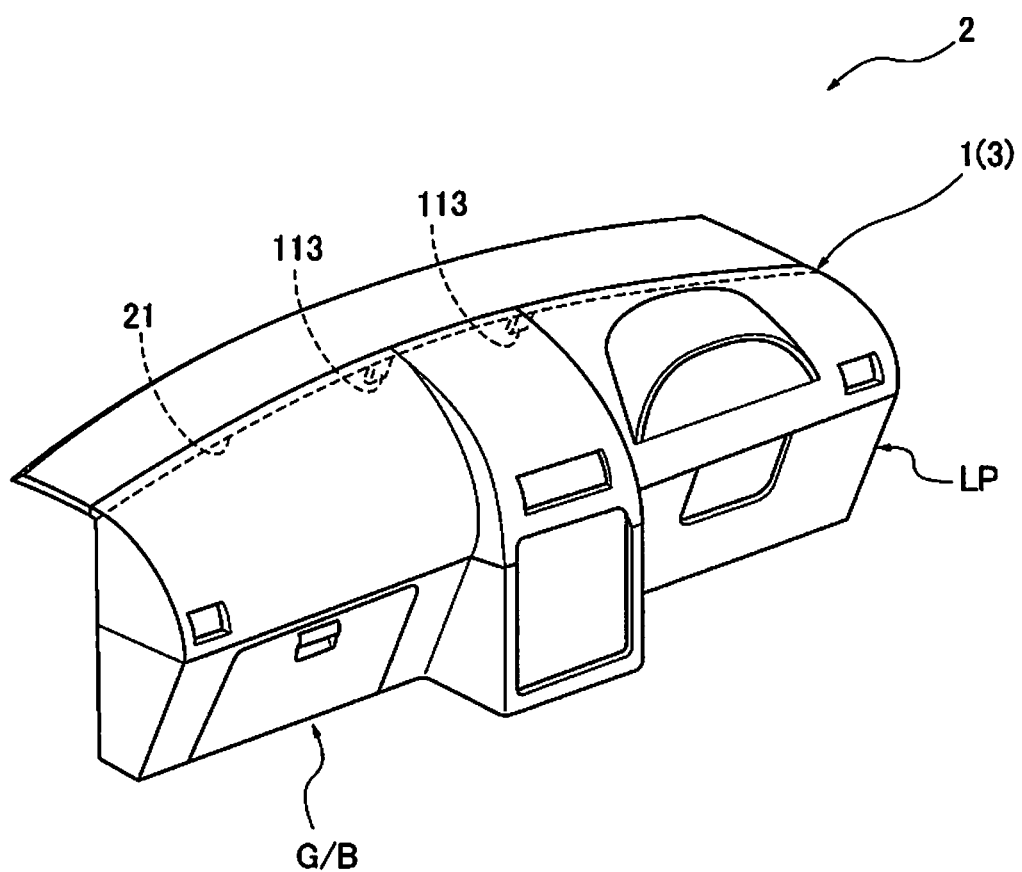
FIG. 18 is a perspective view showing the structure of an interior panel of embodiment 3.
Figure 19:
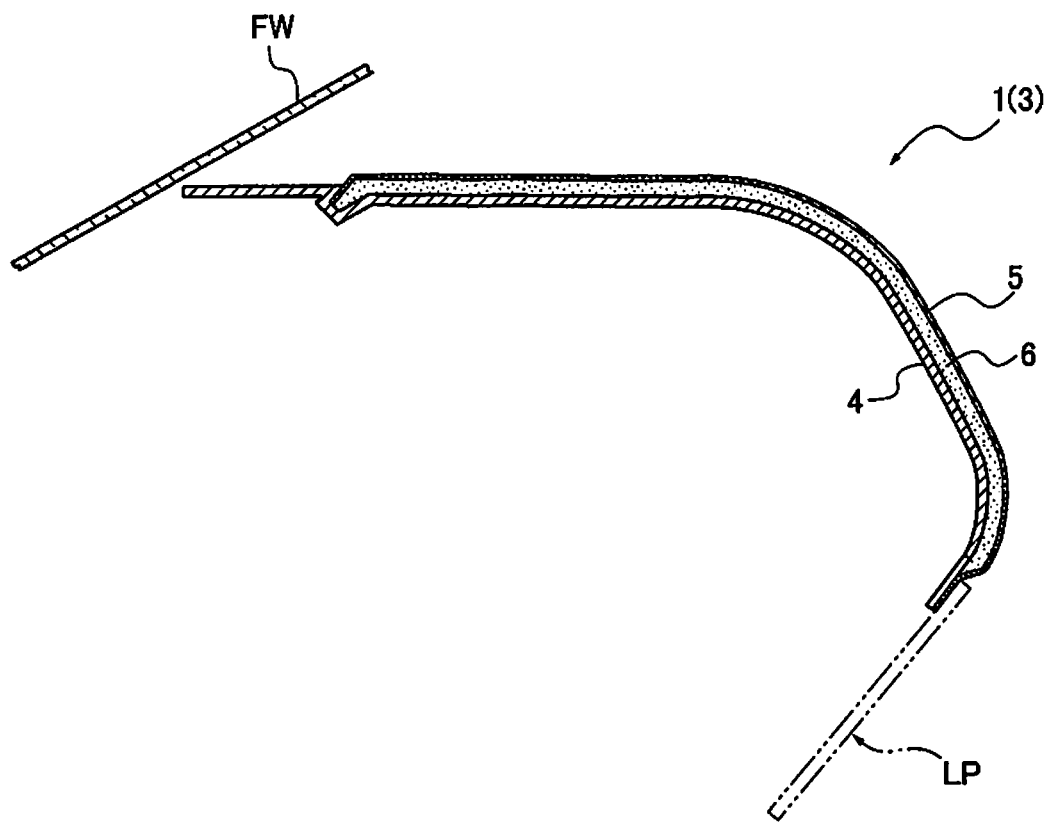
FIG. 19 is a cross section view showing the structure of the interior panel of embodiment 3.

FIG. 18 is a perspective view showing the configuration of the interior panel 2 of embodiment 3. FIG. 19 is a cross section view showing the configuration of the interior panel 2 of embodiment 3. Following, the overall configuration is explained based on FIG. 18 and FIG. 19.

As shown in FIG. 18, the interior panel 2 is configured by the instrument panel 1 and the lower panel LP.

The instrument panel 1 is the foam molded article 3, and as shown in FIG. 19, comprises the core material 4, the skin material 5, and the foam layer 6.

The core material 4 is made of injection molded synthetic resin, and overall is formed to be substantially even thickness.

The skin material 5 is made of vinyl chloride, and overall is formed to be substantially even thickness.

The foam layer 6 is formed by foaming the foaming liquid 14 inside the foam molding device 60 described later. For the foaming liquid 14, liquid urethane or the like, for example, for which a foaming chemical is mixed in a liquid resin raw material is used.

The lower panel LP is made of injection molded synthetic resin, and overall is formed with substantially even thickness.

Detailed Configuration of the Instrument Panel

Figure 20:
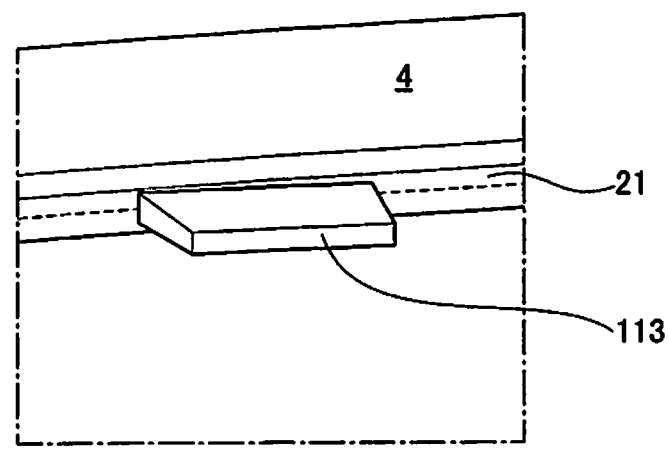
FIG. 20 is an enlarged view showing a rib of (the instrument panel) of embodiment 3.
Figure 21:
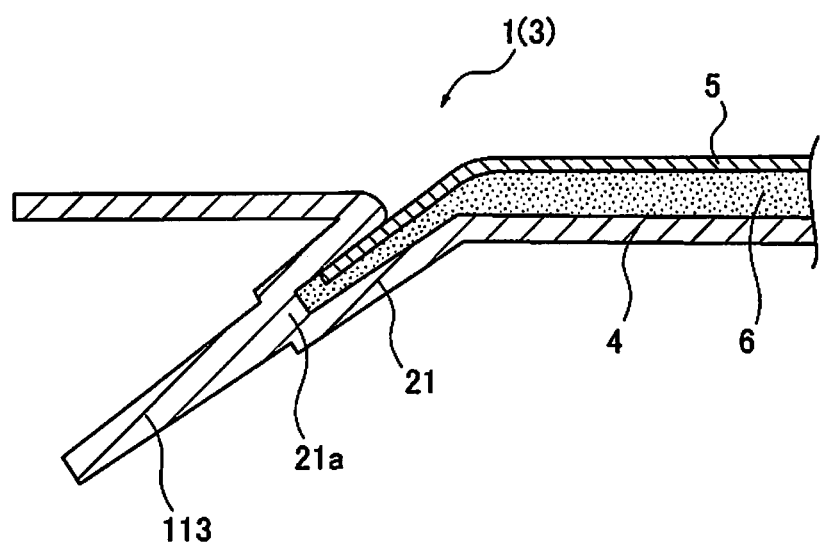
FIG. 21 is a cross section view showing a cross section of a rib part of the interior panel (instrument panel) of embodiment 3.

FIG. 20 is an enlarged view showing a rib 113 of the instrument panel 1 of embodiment 3. FIG. 21 is a cross section view showing a cross section of the rib 113 part of the instrument panel 1 of embodiment 3. Following, the detailed configuration of the instrument panel 1 is explained based on FIG. 18, FIG. 20, and FIG. 21.

The core material 4 of the instrument panel 1 has the recess 21 (recessed groove) and the rib 113, as shown in FIG. 18, FIG. 20, and FIG. 21.

The recess 21 is formed across the entire region of the core material 4 in the vehicle width direction Y, being recessed from the design surface (surface of the core material 4).

As shown in FIG. 18, there are two ribs 113 provided in the center region of the instrument panel 1 in the vehicle width direction Y. Specifically, there are two ribs 113 provided in the center region of the lengthwise direction of the instrument panel 1. As shown in FIG. 21, the rib 113 projects from the bottom part 21a of the recess 21 to the side opposite to the design surface (rear surface side).

Method for Manufacturing the Instrument Panel

Figure 22:
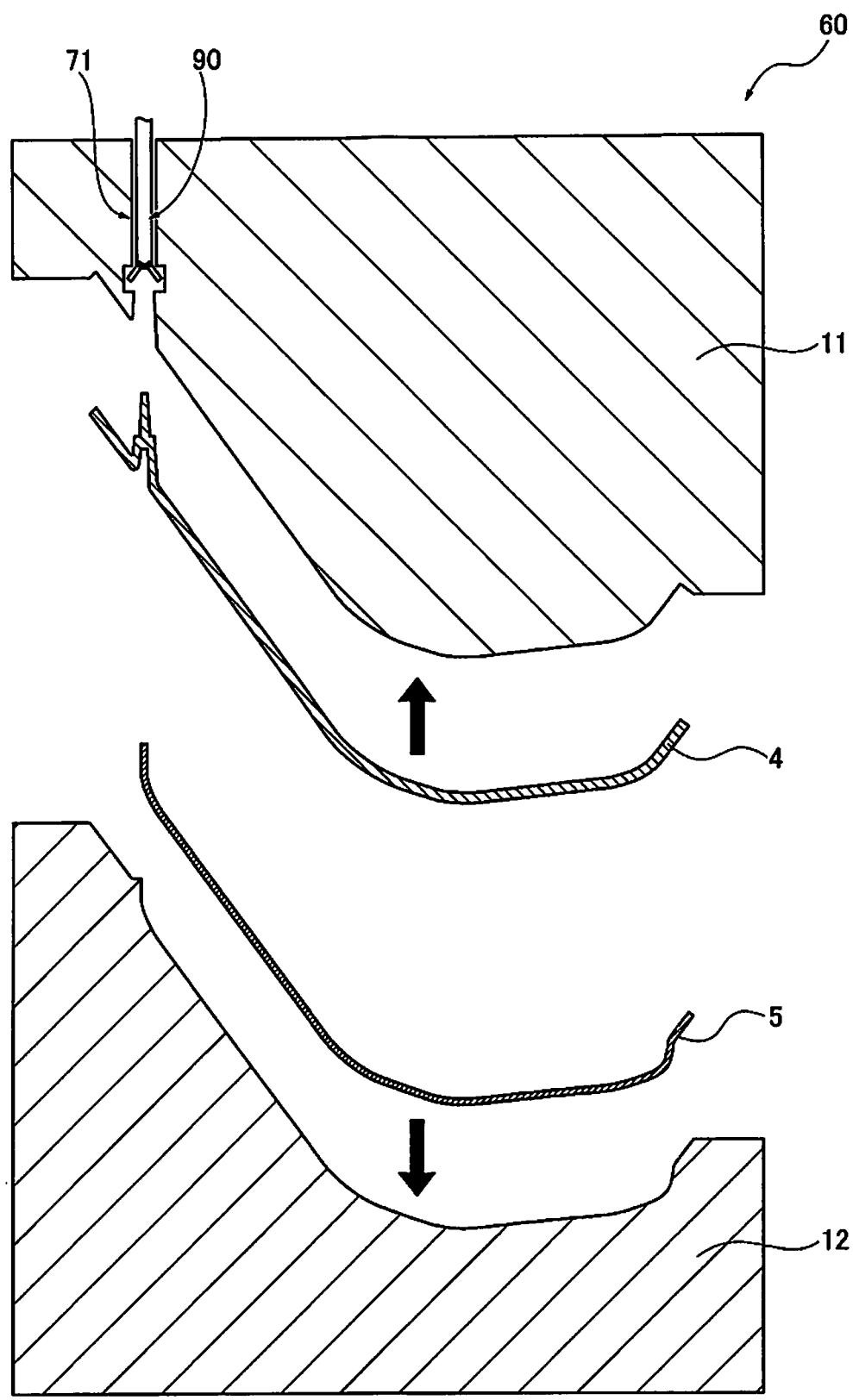
FIG. 22 is an explanatory drawing for explaining the overall configuration of the foam molding device of embodiment 3.
Figure 23:
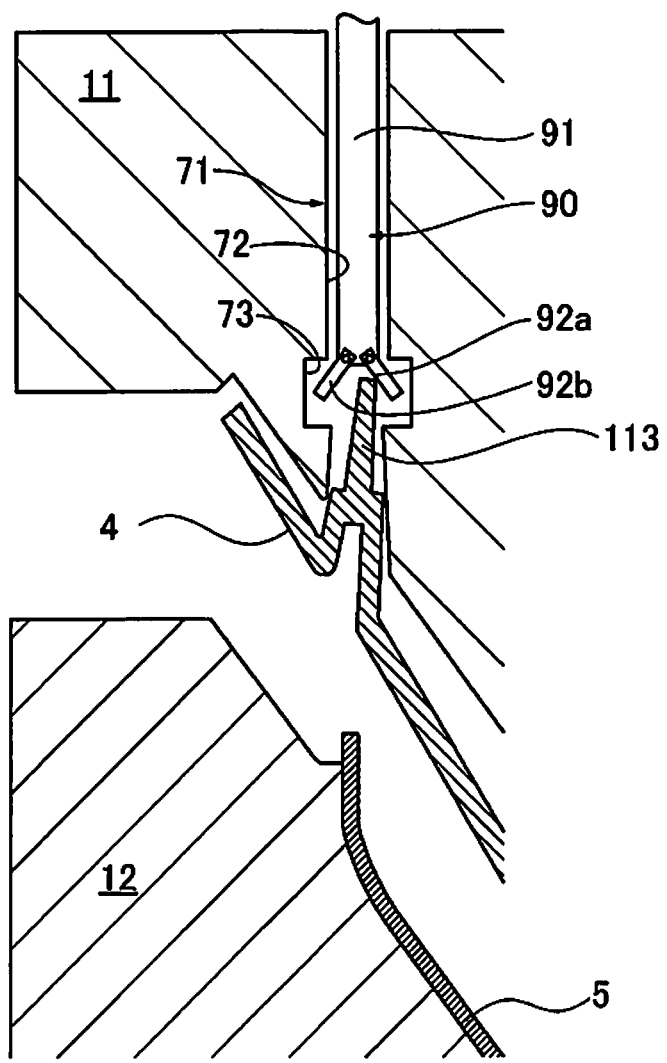
FIG. 23 is an explanatory drawing for explaining a step for drawing in the core material of embodiment 3.
Figure 24:
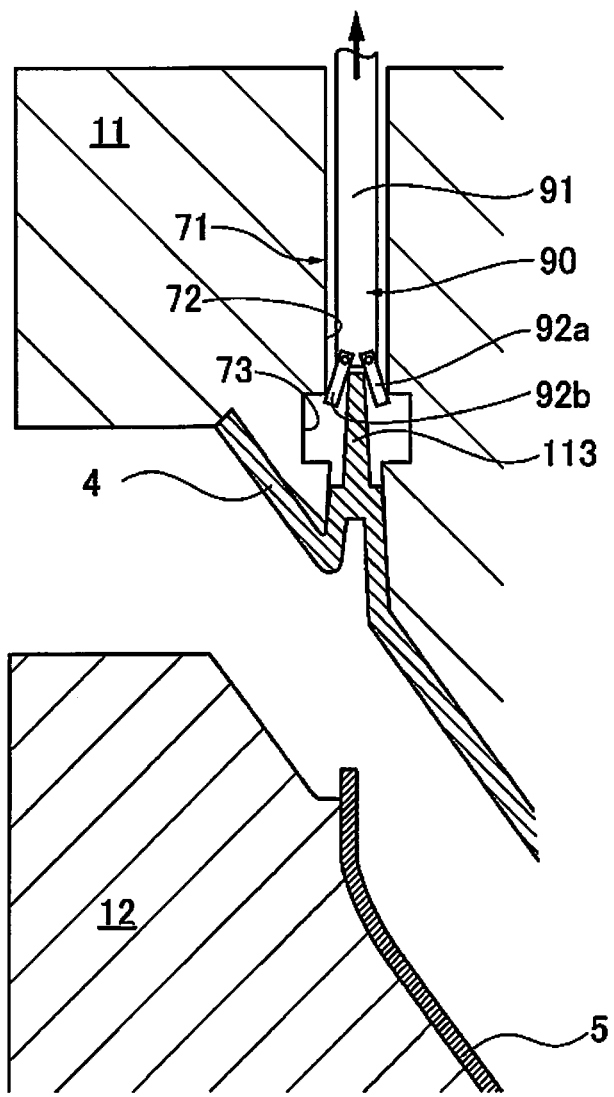
FIG. 24 is an explanatory drawing for explaining a step for drawing in the core material of embodiment 3.
Figure 25:
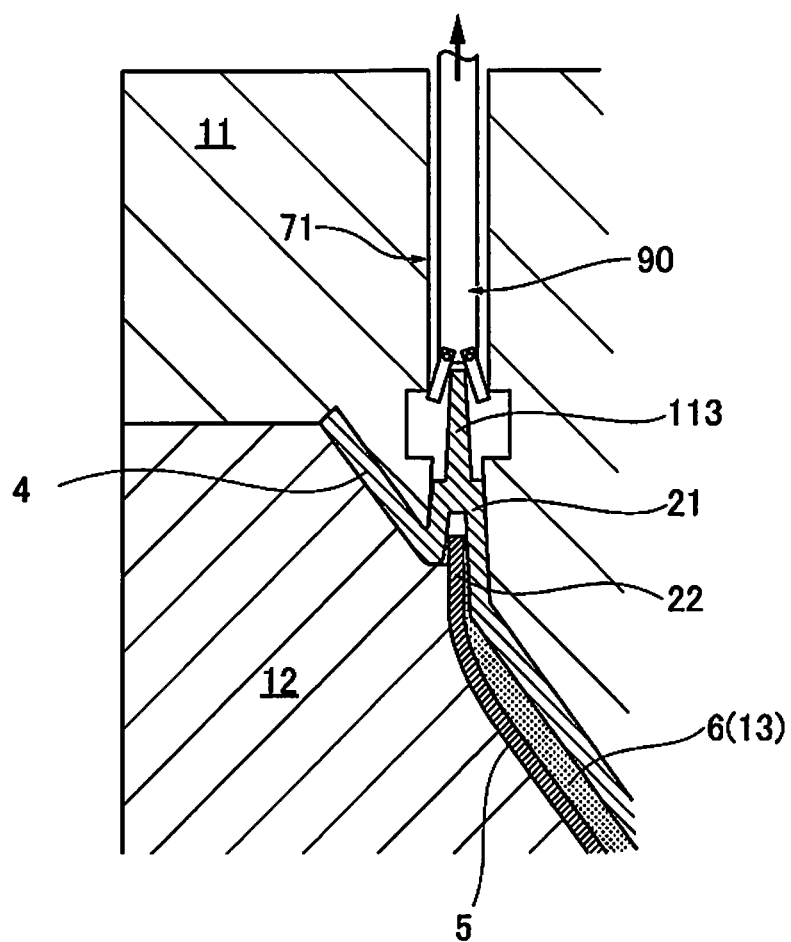
FIG. 25 is an explanatory drawing for explaining a mold clamping step of embodiment 3.
Figure 26:
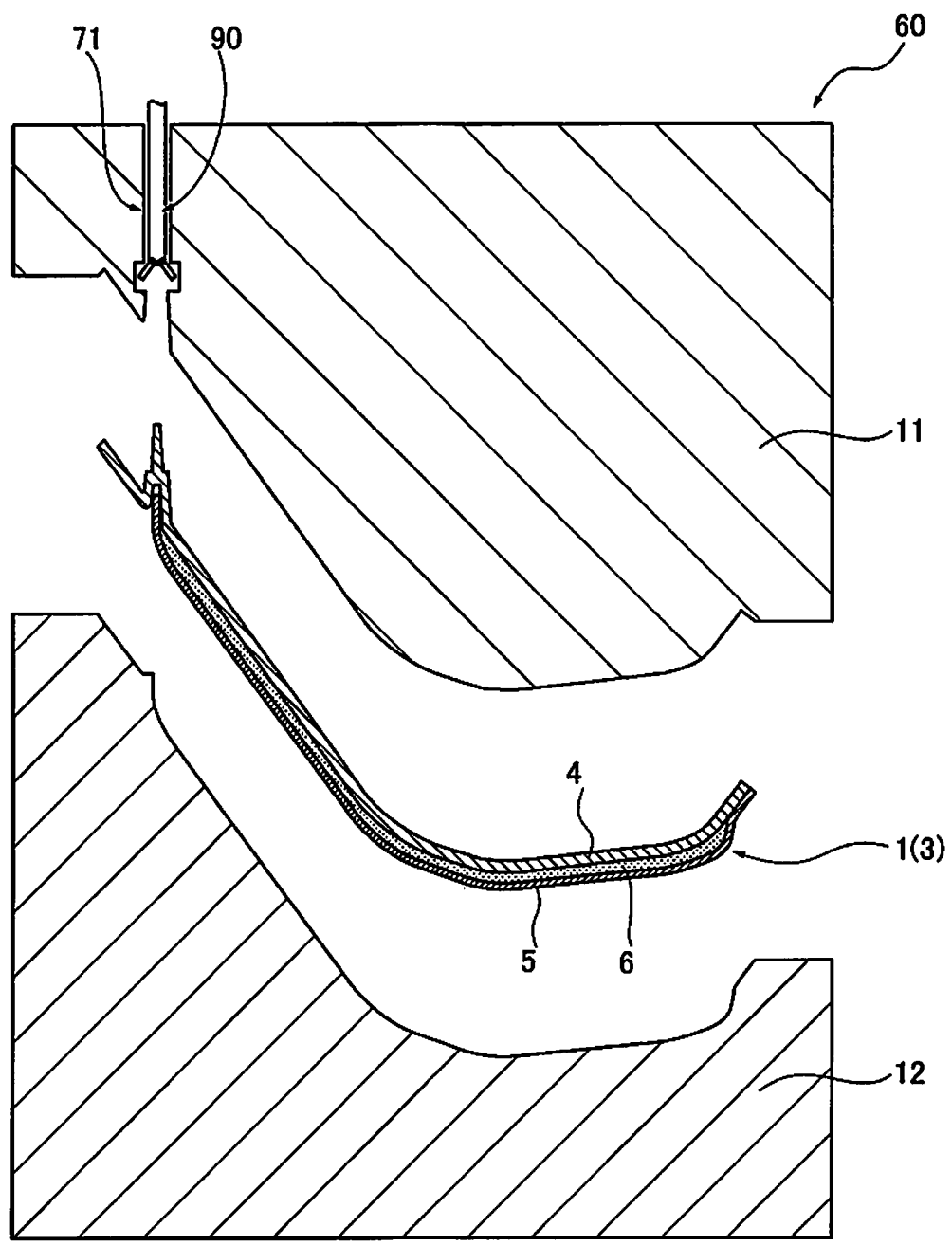
FIG. 26 is an explanatory drawing for explaining a mold opening step of the foam molding of embodiment 3.

FIG. 22 is an explanatory drawing for explaining the overall configuration of the foam molding device of embodiment 3. FIG. 23 is an explanatory drawing for explaining a step for drawing in the core material 4 of embodiment 3. FIG. 24 is an explanatory drawing for explaining a step for drawing in the core material 4 of embodiment 3. FIG. 25 is an explanatory drawing for explaining a mold clamping step of embodiment 3. FIG. 26 is an explanatory drawing for explaining a mold opening step of the foam molding of embodiment 3. Following, the method for manufacturing the instrument panel 1 is explained based on FIG. 22 to FIG. 26.

The instrument panel 1 is the foam molded article 3 manufactured using the foam molding device 60.

First, the detailed configuration of the foam molding device 60 is explained.

As shown in FIG. 22, the foam molding device 60 has one foam molding mold 12 (foaming female mold), the other foam molding mold 11 (foaming male mold), a drawing-in mechanism 90, and a clamp.

The foam molding mold 11 configures the upper mold. The foam molding mold 11 is formed following the shape of the rear surface of the core material 4. The core material 4 is set in the foam molding mold 11.

The foam molding mold 12 configures the lower mold. For the foam molding mold 12, formation follows the shape of the design surface of the interior panel 2. The skin material 5 is set in the foam molding mold 12. The foam molding mold 12 can also have a suction hole connected to a suction source.

The drawing-in mechanism 90 is comprised in the foam molding mold 11.

The clamp clamps the vehicle width direction end part of the core material 4 placed in the foam molding mold 11.

Next, the drawing-in mechanism 90 is explained.

As shown in FIG. 23, the drawing-in mechanism 90 is formed in a groove part 71 formed at the position of the foam molding mold 11 in which the rib 113 is set.

The drawing-in mechanism 90 comprises a slide plate 91, and clamp plates 92a, 92b.

The groove part 71 is configured by a first groove (guiding groove) 72 formed by a cylindrical hole, and a second groove 73 that has a larger diameter than the first groove 72.

The slide plate 91 is installed in the first groove 72, and using hydraulic pressure, can be moved in the mold clamping direction (vertical direction in FIG. 23). The clamp plates 92a, 92b are axially supported on the tip of the slide plate 91.

As shown in FIG. 23, the clamp plates 92a, 92b are in open mode when positioned in the second groove 73.

As shown in FIG. 24, when the slide plate 91 moves upward in the mold clamping direction (upward in FIG. 24), the clamp plates 92a, 92b are moved in the closing direction by the edge of the first groove (guiding groove) 72, and grasp the rib 113 of the core material 4 set in the foam molding mold 11. When the slide plate 91 moves further upward in the mold clamping direction, with the clamp plates 92a, 92b in a state grasping the rib 113, the rib 113 is drawn-in in the direction approaching the foam molding mold 11.

The instrument panel 1 is manufactured using the foam molding device 60 going through a "Core Material and Skin Material Setting Step," a "Core Material Drawing-in Step," a "Mold Clamping Step," a "Foaming Step," and a "Mold Opening Step." Following, the method for manufacturing the instrument panel 1 of embodiment 3 is explained divided into the "Core Material and Skin Material Setting Step," the "Core Material Drawing-in Step," the "Mold Clamping Step," the "Foaming Step," and the "Mold Opening Step."

Core Material and Skin Material Setting Step

As shown in FIG. 22, the core material 4 is placed in the foam molding mold 11. Subsequently, the clamp clamps the four corners of the core material 4. By doing this, the core material 4 is set in the foam molding mold 11. At this time, by the shape of the foam molding mold 11 and the shape of the core material 4 (e.g. boss, rib, etc.), there is position regulation in the vehicle width direction Y and the vehicle front-back direction X. On the other hand, the skin material 5 is placed in the foam molding mold 12.

Core Material Drawing-in Step

Using the drawing-in mechanism 90, from a state in which the core material 4 is set in the foam molding mold 11 (FIG. 23), the rib 113 is grasped, and the core material 4 is moved to be in a state (FIG. 24) for which the rib 113 is drawn in the direction approaching the foam molding mold 11.

Mold Clamping Step

The foam molding mold 11 is moved facing the foam molding mold 12, and as shown in FIG. 25, the foam molding mold 11 and the foam molding mold 12 are mold clamped. At this time, the first edge part 22 (terminal part) of the skin material 5 is inserted in the recess 21 of the core material 4 while the rib 113 is pulled in the direction approaching the foam molding mold 11.

Foaming Step

When the foam molding mold 11 and the foam molding mold 12 are mold clamped, the molding space 13 (foam molding space) is formed between the core material 4 and the skin material 5. The foaming liquid 14 is injected into the center part of the molding space 13. The foaming liquid 14 becomes a flowable foam body by the gas generated from the foaming agent. The foam body expands from the center part of the molding space 13 to the peripheral part. At this time, by the foaming pressure by the foaming liquid 14, the first edge part 22 (terminal part) of the skin material 5 is pressure welded to the inner wall of the vehicle front side of the recess 21 of the core material 4, and seals the molding space 13. By doing this, the foam layer 6 is formed between the core material 4 and the skin material 5.

Mold Opening Step

The foam molding mold 11 can be moved in the direction separating from the foam molding mold 12, and as shown in FIG. 26, the instrument panel 1 can be taken out from the foam molding device 60.

Actions

Next, the actions are explained.

The effects of the foam molded article 3 and the manufacturing method thereof of embodiment 3 are explained divided into "Comparative Action" and "Other Characteristic Actions of the Foam Molded Article and the Manufacturing Method Thereof"

Comparative Action

Figure 27:
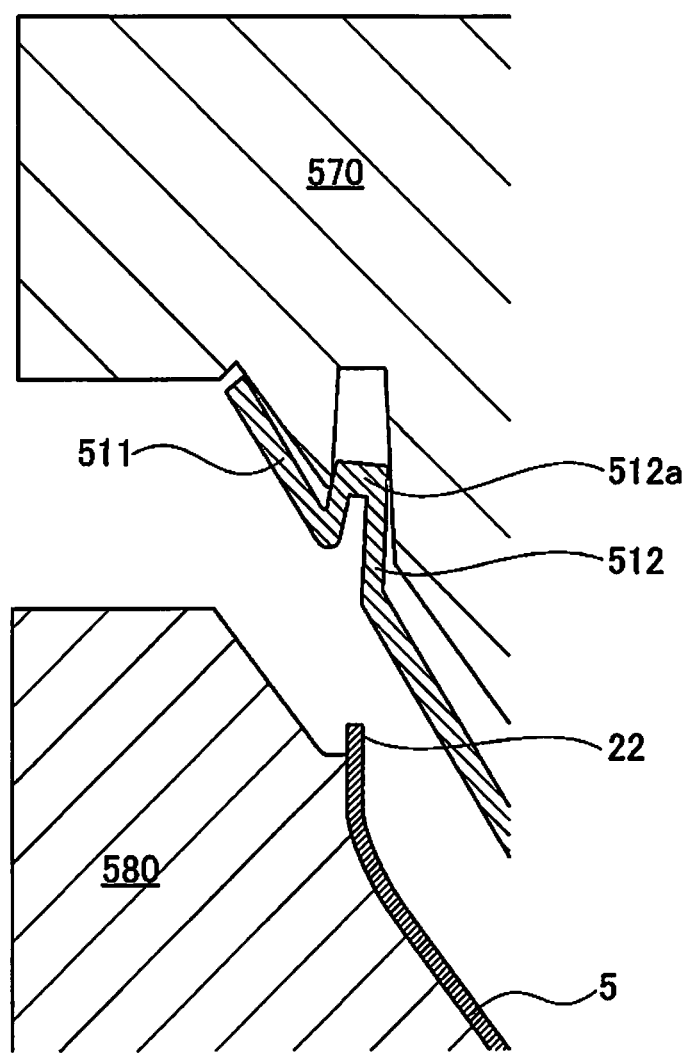
FIG. 27 is a cross section view showing the foam molding mold of a comparison example.

For example, as shown in FIG. 27, an instrument panel that does not have a rib projecting to the side opposite to the design surface (rear surface side) from a bottom part 512a of a recess 512 (recessed groove) in a core material 511 is used as a comparison example.

Here, as shown in FIG. 27, the core material 511 is formed using injection molding, and the deformation of the core material 511 is greater than the deformation of the foam molding mold (foaming male mold 570, foaming female mold 580). For that reason, in a state with the core material 511 set in the foaming male mold, the core material 511 is in a floating state (separated state) with respect to the foaming male mold 570.

Having done that, even if the foaming male mold 570 is moved facing the foaming female mold 580, there is a risk that the first edge part 22 of the skin material 5 will not be suitably inserted in the recess 512 of the core material 511. As a result, this causes deformation of the skin material 5 such as surface waviness, etc.

In contrast to this, embodiment 3 includes: a mold clamping step for mold clamping the foam molding mold 12 in which the skin material 5 is placed, and the foam molding mold 11 in which the core material 4 is placed; and a foaming step for doing foaming formation of the foam layer 6 between the skin material 5 and the core material 4 by the foaming liquid 14 injected in the foam molding molds 11, 12. With this method for manufacturing the instrument panel 1, in the mold clamping step, the first edge part 22 of the skin material 5 is inserted in the recess 21 indented from the design surface side of the core material 4, and in the foaming step, by the foaming pressure by the foaming liquid 14, the first edge part 22 is pressure welded to the inner wall of the recess 21, sealing the molding space 13, the core material 4 comprises the rib 113 that projects to the rear surface side of the core material 4, and there is included a step of inserting the first edge part 22 in the recess 21 while pulling the rib 113 in the direction approaching the foam molding mold 11 (FIG. 25).

By doing this, it is possible to draw in the core material 4 in the direction approaching the foam molding mold 11. For this reason, floating of the core material 4 with respect to the foam molding mold 11 is suppressed, and it is possible to suppress variation of setting of the core material 4 in the foam molding mold 11. As a result, deformation of the skin material 5 of the instrument panel 1 during foam molding is suppressed.

Other Characteristic Actions of the Foam Molded Article and the Manufacturing Method Thereof For example, both end parts in the lengthwise direction of the core material 4 are clamped to the foam molding mold 11 using a clamp mechanism, and when the center region in the lengthwise direction of the core material 4 is not clamped, the floating of the core material 4 with respect to the foam molding mold 11 becomes greatest at the center region in the lengthwise direction of the core material 4.

For that reason, in the case of the comparison example in FIG. 27, at the center region of the lengthwise direction of the core material 4, there is a marked risk that the first edge part 22 of the skin material 5 will not be suitably inserted in the recess 512 of the core material 511.

In contrast to this, with embodiment 3, the rib 113 is provided at the center region in the lengthwise direction of the core material 4 (FIG. 18).

By doing this, it is possible to draw the center region in the lengthwise direction of the core material 4 for which the floating of the core material 4 with respect to the foam molding mold 11 is greatest in the direction approaching the foam molding mold 11. For this reason, floating of the core material 4 with respect to the foam molding mold 11 is suppressed, and it is possible to suppress variation of setting of the core material 4 in the foam molding mold 11. As a result, deformation of the skin material 5 of the instrument panel 1 during foam molding is suppressed.

With embodiment 3, the rib 113 projects from the bottom part 21a of the recess 21 to the rear surface side of the core material 4 (FIG. 21).

By doing this, it is possible to draw the recess 21 of the core material 4 in which the first edge part 22 of the skin material 5 is inserted in the direction approaching the foam molding mold 11. For this reason, it is possible to suppress variation in setting of the recess 21 in the foam molding mold 11, and possible to suitably insert the first edge part 22 of the skin material 5 in the recess 21 of the core material 4. As a result, deformation of the skin material 5 of the instrument panel 1 during foam molding is suppressed.

With embodiment 3, in the instrument panel 1 for which the core material 4 and the skin material 5 are made to be an integrated unit by the foam layer 6, comprised are the recess 21 in which the first edge part 22 of the skin material 5 is inserted, being the recess 21 recessed from the design surface side of the core material 4, and the rib 113 projecting from the bottom part 21a of the recess 21 to the rear surface side of the core material 4 (FIG. 21).

By doing this, the rib 113 is pulled in the direction approaching the foam molding mold 11, and it is possible to draw the recess 21 of the core material 4 in which the first edge part 22 of the skin material 5 is inserted in the direction approaching the foam molding mold 11. For this reason, it is possible to suppress variation of setting of the recess 21 in the foam molding mold 11, and possible to suitably insert the first edge part 22 of the skin material 5 in the recess 21 of the core material 4. As a result, deformation of the skin material 5 of the instrument panel 1 during foam molding is suppressed.

With embodiment 3, the rib 113 is provided in the center region in the lengthwise direction of the core material 4 (FIG. 18).

By doing this, it is possible to draw the lengthwise direction center region of the core material 4 in which the floating of the core material 4 with respect to the foam molding mold 11 is greatest in the direction approaching the foam molding mold 11. For this reason, floating of the core material 4 with respect to the foam molding mold 11 is reliably suppressed, and it is possible to suppress variation of setting of the core material 4 in the foam molding mold 11. As a result, deformation of the skin material 5 of the instrument panel 1 during foam molding is suppressed.

Effects

Next, effects are explained.

The effects listed hereafter can be obtained with the foam molded article 3 and the manufacturing method thereof of embodiment 3.

(Effect 3-1) Included are: a mold clamping step for mold clamping one molding mold (foam molding mold 12) in which the skin material 5 is placed, and the other molding mold (foam molding mold 11) in which the core material 4 is placed; and a foaming step for doing foaming formation of the foam layer 6 between the skin material 5 and the core material 4 by the foaming liquid 14 injected in the molding molds (foam molding mold 11, foam molding mold 12). With this method for manufacturing the foam molded article 3 (instrument panel 1), in the mold clamping step, the first edge part 22 of the skin material 5 is inserted in the recess 21 that is recessed from the design surface side of the core material 4, and in the foaming step, by the foaming pressure by the foaming liquid 14, the first edge part 22 is pressure welded to the inner wall of the recess 21, sealing the molding space 13, the core material 4 comprises the rib 113 projecting to the rear surface side of the core material 4, and included is a step for inserting the first edge part 22 in the recess 21 while pulling the rib 113 in the direction approaching the other molding mold (foam molding mold 11) (FIG. 25).

For this reason, floating of the core material 4 with respect to the other molding mold (foam molding mold 11) is suppressed, and it is possible to suppress variation of setting of the core material 4 in the other molding mold (foam molding mold 11). As a result, it is possible to suppress deformation of the skin material 5 of the foam molded article 3 (instrument panel 1) during foam molding.

(Effect 3-2)

The rib 113 is provided in the center region in the lengthwise direction of the core material 4 (FIG. 18).

For this reason, floating of the core material 4 with respect to the other molding mold (foam molding mold 11) is suppressed, and it is possible to suppress variation of setting of the core material 4 in the other molding mold (foam molding mold 11). As a result, it is possible to suppress deformation of the skin material 5 of the foam molded article 3 (instrument panel 1) during foam molding.

(Effect 3-3) The rib 113 projects from the bottom part 21a of the recess 21 to the rear surface side of the core material 4 (FIG. 21).

For this reason, it is possible to suppress variation of setting of the recess 21 with respect to the other molding mold (foam molding mold 11), and possible to suitably insert the first edge part 22 of the skin material 5 in the recess 21 of the core material 4. As a result, it is possible to suppress deformation of the skin material 5 of the foam molded article 3 (instrument panel 1) during foam molding.

(Effect 3-4) In the foam molded article 3 (instrument panel 1) for which the core material 4 and the skin material 5 are made to be an integrated unit by the foam layer 6, comprised are the recess 21 in which the first edge part 22 of the skin material 5 is inserted, provided so as to be recessed from the design surface side of the core material 4, and the rib 113 that projects from the bottom part 21a of the recess 21 to the rear surface side of the core material 4 (FIG. 21).

For this reason, it is possible to suppress variation of the setting of the recess 21 in the other molding mold (foam molding mold 11), and possible to suitably insert the first edge part 22 of the skin material 5 in the recess 21 of the core material 4. As a result, it is possible to suppress deformation of the skin material 5 of the foam molded article 3 (instrument panel 1) during foam molding.

Above, the foam molded article 3 and the manufacturing method thereof of the present disclosure were explained based on embodiment 3. However, the specific configuration is not limited to these embodiments, and as long as they do not stray from the gist of the present disclosure regarding each claim of the scope of patent claims, design modifications, additions, etc., are permitted.

With embodiment 3, an example of providing two ribs 113 was shown. However, it is also possible to provide one, or to provide three or more ribs 113.

With embodiment 3, an example of providing the rib 113 on the bottom part 21a of the recess 21 was shown. However, the rib 113 is not limited to the example of being provided in the recess 21.

With embodiment 3, an example of grasping the rib 113 and drawing it in the direction approaching the foam molding mold 11 was shown. However, the object being grasped is not limited to being the rib 113, and may also be a boss, for example.

With embodiment 3, an example of implementing the mold clamping step after the drawing in step of the core material 4 was shown. However, it is also possible to implement the core material 4 drawing in step and the mold clamping step simultaneously.

With embodiment 3, an example of having the drawing-in mechanism 90 comprise the slide plate 91, and the clamp plates 92a, 92b was shown. However, as the drawing-in mechanism 90, it is sufficient to be a mechanism that grasps and draws in the rib 113.

With embodiment 3, an example is shown of the foam molded article 3 and the manufacturing method thereof being applied to the instrument panel 1 as the interior panel 2. However, as the foam molded article 3 and the manufacturing method thereof of the present disclosure, it is also possible to apply this to various vehicle interior parts such as a door arm, a console, a pillar, etc.

CROSS REFERENCE TO RELATED APPLICATIONS

Explanation of Codes

1 Instrument panel; 3 Foam molded article; 4 Core material; 5 Skin material; 6 Foam layer; 7 Sealing part; 11 Foam molding mold; 12 Foam molding mold; 14 Foaming liquid; 21 Recess; 21a Bottom part; 22 Edge part; 23 Self sealing part; 25 Edge part; 26 Clamp sealing part; 27 Switchover part; 28 Edge part; 29 Crimp sealing part; 30 Cover part; 32 Bending angle; 41 Bending angle; 51 Thickness; 52 Length; 53 Interference part; 55 Groove width; 56 Narrow width part; 61 Inner circumference wall; 62 Bottom part; 63 Groove part; 64 Notch part; 65 Gas; 66 Concavity; and 113 Rib.

The invention claimed is:

1. A foam molded article comprising:
a core material including a contact part including a first portion defining a recess, a second portion spaced apart from the recess, and a third portion disposed between the first portion and the second portion;
a skin material including a first edge part, a second edge part and a third edge part that are sealed with the contact part of the core material, the third edge part being disposed between the first edge part and the second edge part; and
a foam layer formed in a sealed space formed between the core material and the skin material, wherein
the first edge part of the skin material and the recess defined by the first portion of the contact part of the core material define a self sealing part in which the first edge part of the skin material is housed in the recess,
the second edge part of the skin material and the second portion of the contact part of the core material define a clamp sealing part in which the second edge part of the skin material and the second part of the core material are sealed by clamping by foam molding molds and the second edge part of the skin material and the second portion of the contact part of the core material extend parallel to each other, and
the third edge part of the skin material and the third portion of the contact part of the core material define a crimp sealing part arranged between the clamp sealing part and the self sealing part, and sealed by crimping with the third edge part of the skin material being pressed against the third portion of the contact part of the core material.

2. The foam molded article of claim 1, wherein
the skin material further includes an inner part arranged inwardly of the first edge part, the second edge part, and the third edge part, and
a bending angle of the third edge part of the skin material in the crimp sealing part with respect to the inner part is greater than a bending angle of the first edge part of the skin material in the self sealing part with respect to the inner part.

3. The foam molded article of claim 1, wherein
the third edge part of the skin material in the crimp sealing part is thicker than the second edge part of the skin material, and the third edge part of the skin material has a length for which the third edge part of the skin material interferes with the third portion of the contact part of the core material, or defines an interference part that extends in a direction that interferes with the core material.

4. The foam molded article of claim 1, wherein
the first portion of the contact part of the core material includes an inner circumference wall and an outer circumference wall defining the recess,
the outer circumference wall facing an outer surface of the first edge part of the skin material, and the inner circumference wall facing an inner surface of the first edge part of the skin material, and
at least one of the inner circumference wall defining the recess and the inner surface of the first edge part of the skin material defines a communication opening through which the sealed space is in fluid communication with a bottom part of the recess.

5. A foam molded article configured to be coupled to a cover part, the foam molded article comprising:
a core material including a contact part including a first portion defining a recess, a second portion spaced apart from the recess, and a third portion disposed between the first portion and the second portion;
a skin material including a first edge part, a second edge part and a third edge part that are sealed with the contact part of the core material, the third edge part being disposed between the first edge part and the second edge part; and
a foam layer formed in a sealed space formed between between the core material and the skin material, wherein
the first edge part of the skin material and the recess defined by the first portion of the contact part of the core material define a self sealing part in which the first edge part of the skin material is housed in the recess,
the second edge part of the skin material and the second portion of the contact part of the core material define a clamp sealing part in which the second edge part of the skin material and the second portion of the contact part of the core material are sealed by clamping by foam molding molds and the second edge part of the skin material and the second portion of the contact part of the core material extend parallel to each other, and
the third edge part of the skin material and the third portion of the contact part of the core material define a switchover part between the clamp sealing part and the self sealing part, the switchover part being configured to be hidden by the cover part.

6. The foam molded article of claim 5, wherein
the third portion of the contact part of the core material defines a concavity at a position corresponding to the switchover part, and
the concavity is deeper than the recess defined by the first portion of the contact part of the core material in the self sealing part.

7. The foam molded article of claim 5, wherein
the recess defined by the first portion of the contact part of the core material includes a narrow width part having a width narrower than a width of the recess at a position other than the narrow width part, the narrow width part being arranged adjacent to the switchover part.

8. The foam molded article of claim 7, wherein
the first portion of the contact part of the core material includes an inner circumference wall and an outer circumference wall defining the recess, and
the inner circumference wall of the recess gradually approaches toward the outer circumference wall of the recess in the narrow width part.

9. The foam molded article of claim 5, wherein
the third edge part of the skin material and the third portion of the contact part of the core material define a crimp sealing part arranged in the switchover part, sealed by crimping with the third edge part of the skin material being pressed against the third portion of the contact part of the core material.

\* \* \* \* \*